US012590639B2

(12) United States Patent
Shorback et al.

(10) Patent No.: US 12,590,639 B2
(45) Date of Patent: **\*Mar. 31, 2026**

(54) VALVE WITH UNOBSTRUCTED FLOW PATH HAVING INCREASED FLOW COEFFICIENT

(71) Applicant: Crane ChemPharma & Energy Corp., The Woodlands, TX (US)

(72) Inventors: Mark Shorback, Southport, NC (US); Jörg Massow, Kreuztal (DE); Venkatesh Sureshrao Kulkarni, Pune (IN); Vishal Ambadas Chaudhari, Pune (IN); Ranjit Narayan Bhalkar, Pune (IN); Prashant Ramchandra Sangule, Pune (IN); Samson Kay, Cincinnati, OH (US)

(73) Assignee: Crane ChemPharma & Energy Corp., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,730

(22) Filed: Apr. 8, 2024

(65) Prior Publication Data

US 2024/0255060 A1 Aug. 1, 2024

Related U.S. Application Data

(63) Continuation of application No. 17/248,856, filed on Feb. 10, 2021, now Pat. No. 11,953,113.

(Continued)

(51) Int. Cl.
F16K 3/314 (2006.01)
F16K 1/20 (2006.01)
(Continued)

(52) U.S. Cl.
CPC ................ F16K 3/314 (2013.01); F16K 3/22 (2013.01); F16K 27/04 (2013.01); F16K 1/2057 (2013.01); F16K 5/0605 (2013.01)

(58) Field of Classification Search
CPC . F16K 3/314; F16K 3/22; F16K 27/04; F16K 5/0478; F16K 1/2261; F16K 1/222;
(Continued)

(56) References Cited

U.S. PATENT DOCUMENTS 2,173,949 A * 9/1939 Neveu .................. B60T 17/043
251/86
2,302,695 A 11/1942 Kalix
(Continued)

FOREIGN PATENT DOCUMENTS

CN 203176414 U 9/2013
CN 109519556 A 3/2019

OTHER PUBLICATIONS

Communication pursuant to Article 94(3} EPC dated Feb. 10, 2025, in connection with European Patent Application No. 21156812.6, 8 pages.
(Continued)

*Primary Examiner* — Craig J Price

(57) ABSTRACT

A valve comprising a valve body including a first end and a second end spaced apart along a longitudinal axis, a central portion disposed between the first end and the second end, wherein the first end and the second end define a first flow passageway and a second flow passageway, respectively, and wherein the central portion defines an interior chamber, wherein the first end of the valve body includes a bore, and a removable seat disposed in the bore and defining at least in part the first flow passageway.

19 Claims, 26 Drawing Sheets

Related U.S. Application Data

(60) Provisional application No. 62/976,579, filed on Feb. 14, 2020.

(51) Int. Cl.
  *F16K 3/22* (2006.01)
  *F16K 27/04* (2006.01)
  *F16K 5/06* (2006.01)

(58) Field of Classification Search
  CPC ...... F16K 1/2078; F16K 1/205; F16K 5/0605;
            F16K 5/0647; F16K 11/0876; F16K
            11/18; F16K 11/087; F16K 11/0873;
            F16K 5/20; F16K 5/0626; F16K 5/08;
            F16K 27/0227; F16K 27/067; F16K
            1/2057; F16K 1/2014; F16K 1/2028;
            B60T 17/043
  USPC .................... 251/181, 316, 315.08, 361, 360
  See application file for complete search history.

(56) References Cited

U.S. PATENT DOCUMENTS

| | | | | | |
|---|---|---|---|---|---|
| 2,312,290 | A | * | 2/1943 | Smith | F16K 15/03 |
| | | | | | 137/527.4 |
| 2,621,483 | A | * | 12/1952 | Kalix | F03B 3/00 |
| | | | | | 415/60 |
| 3,033,227 | A | * | 5/1962 | Goldman | F16K 5/201 |
| | | | | | 137/328 |
| 3,170,669 | A | * | 2/1965 | Roos | F16K 5/184 |
| | | | | | 251/210 |
| 3,288,430 | A | * | 11/1966 | Priese | F16K 5/0642 |
| | | | | | 285/390 |
| 3,556,476 | A | * | 1/1971 | Haenky | F16K 1/24 |
| | | | | | 251/306 |
| 3,570,510 | A | * | 3/1971 | Tsutsumi | F16K 1/2085 |
| | | | | | 137/15.04 |
| 3,623,696 | A | * | 11/1971 | Baumann | F16K 1/224 |
| | | | | | 251/298 |
| 3,893,469 | A | * | 7/1975 | Baker | F16K 5/0626 |
| | | | | | 251/315.15 |
| 3,934,608 | A | * | 1/1976 | Guyton | F16K 15/03 |
| | | | | | 137/527.8 |
| 3,938,541 | A | * | 2/1976 | Polacheck | F16K 41/00 |
| | | | | | 137/239 |
| 3,945,398 | A | * | 3/1976 | Masheder | F16K 1/222 |
| | | | | | 137/527.8 |
| 3,946,986 | A | * | 3/1976 | Sutter | F16K 5/204 |
| | | | | | 251/304 |
| 3,955,592 | A | * | 5/1976 | Guyton | F16K 15/03 |
| | | | | | 137/329 |
| 4,027,696 | A | * | 6/1977 | Guyton | F16K 15/03 |
| | | | | | 137/527.4 |
| 4,044,994 | A | * | 8/1977 | Priese | F16K 5/0673 |
| | | | | | 251/315.08 |
| 4,067,359 | A | * | 1/1978 | Kwast | F16K 1/2028 |
| | | | | | 137/461 |
| 4,134,595 | A | * | 1/1979 | Melville | F16K 5/0668 |
| | | | | | 251/315.05 |
| 4,265,426 | A | * | 5/1981 | Thurston | F16K 1/2263 |
| | | | | | 251/306 |
| 4,304,254 | A | * | 12/1981 | O'Connell | F16K 43/00 |
| | | | | | 137/315.16 |
| 4,332,370 | A | * | 6/1982 | Williams | F16K 41/16 |
| | | | | | 251/312 |
| 4,460,011 | A | * | 7/1984 | Huber, Jr. | F16K 1/2014 |
| | | | | | 251/298 |
| 4,651,775 | A | * | 3/1987 | Okada | F16K 11/0873 |
| | | | | | 137/625.3 |
| 4,681,133 | A | * | 7/1987 | Weston | F16K 3/0209 |
| | | | | | 166/86.1 |
| 4,706,706 | A | * | 11/1987 | Page | F16K 15/03 |
| | | | | | 277/641 |
| 4,822,000 | A | * | 4/1989 | Bramblet | F16K 5/0647 |
| | | | | | 251/298 |
| 4,911,413 | A | * | 3/1990 | Baba | F16K 1/2266 |
| | | | | | 251/315.08 |
| 4,984,767 | A | * | 1/1991 | Daghe | F16K 5/0642 |
| | | | | | 251/297 |
| 4,989,833 | A | * | 2/1991 | Polon | F16K 5/0605 |
| | | | | | 251/309 |
| 5,016,857 | A | * | 5/1991 | Bovee | F16K 5/0605 |
| | | | | | 251/304 |
| 5,439,052 | A | * | 8/1995 | Skinner | F16K 11/0873 |
| | | | | | 166/85.2 |
| 5,820,103 | A | * | 10/1998 | Nilsson | F16K 1/222 |
| | | | | | 251/315.16 |
| 5,823,540 | A | * | 10/1998 | Grabau | C09K 3/1009 |
| | | | | | 277/536 |
| 6,079,695 | A | * | 6/2000 | Gasaway | F16K 1/226 |
| | | | | | 251/305 |
| 6,213,141 | B1 | * | 4/2001 | Eggleston | F16K 1/2263 |
| | | | | | 29/890.132 |
| 6,378,842 | B1 | * | 4/2002 | Frese | F16K 27/067 |
| | | | | | 251/315.12 |
| 6,669,171 | B1 | * | 12/2003 | Stunkard | F16K 5/0673 |
| | | | | | 251/315.08 |
| 6,981,691 | B2 | * | 1/2006 | Caprera | F16K 5/12 |
| | | | | | 251/315.16 |
| 6,988,708 | B2 | * | 1/2006 | Caprera | F16K 5/0668 |
| | | | | | 251/192 |
| 7,059,585 | B2 | * | 6/2006 | Dalluge | F16K 5/20 |
| | | | | | 251/315.16 |
| 7,484,710 | B2 | * | 2/2009 | Koester | F16K 5/0689 |
| | | | | | 251/192 |
| 7,537,062 | B2 | * | 5/2009 | Hughes | E21B 34/06 |
| | | | | | 251/298 |
| 8,113,484 | B2 | * | 2/2012 | Hostetter | F16K 5/204 |
| | | | | | 251/174 |
| 8,622,368 | B2 | * | 1/2014 | Geiser | H01L 21/67751 |
| | | | | | 251/301 |
| 9,004,450 | B2 | * | 4/2015 | Bolanahalli | F16K 5/0407 |
| | | | | | 251/301 |
| 9,303,567 | B2 | * | 4/2016 | Dickinson | F02D 9/16 |
| 9,560,805 | B2 | * | 2/2017 | Hull | F16K 15/03 |
| 9,958,080 | B2 | * | 5/2018 | Fan | F16K 27/067 |
| 10,060,538 | B2 | * | 8/2018 | Corte, Jr. | F16K 5/201 |
| 10,132,418 | B2 | * | 11/2018 | Diaz | F16K 15/035 |
| 10,208,863 | B2 | * | 2/2019 | Robinson | F16K 5/0626 |
| 10,378,490 | B2 | * | 8/2019 | Sugawara | F02M 26/21 |
| 10,539,103 | B2 | * | 1/2020 | Ooki | F02M 35/104 |
| 10,563,777 | B2 | * | 2/2020 | Han | F16K 5/204 |
| 10,830,157 | B2 | * | 11/2020 | Ito | F02D 9/1015 |
| 11,480,254 | B2 | * | 10/2022 | Kulkarni | B21K 1/24 |
| 11,512,781 | B2 | * | 11/2022 | Witkowski | F16K 1/42 |
| 11,519,509 | B2 | * | 12/2022 | Shorback | F16K 1/2028 |
| 11,761,552 | B2 | * | 9/2023 | Harada | F02M 26/70 |
| | | | | | 251/315.1 |
| 11,841,089 | B2 | * | 12/2023 | Shorback | F16K 27/04 |
| 11,946,557 | B2 | * | 4/2024 | Shorback | F16K 3/22 |
| 11,953,113 | B2 | * | 4/2024 | Shorback | F16K 3/314 |
| 11,998,779 | B2 | * | 6/2024 | Cui | A62C 35/68 |
| 12,025,239 | B2 | * | 7/2024 | Feenstra | F16K 15/03 |
| 12,441,557 | B2 | * | 10/2025 | Yoon | B65G 49/067 |
| 2009/0050097 | A1 | * | 2/2009 | Albiez | F16K 1/2028 |
| | | | | | 123/184.56 |
| 2012/0181468 | A1 | | 7/2012 | Telep et al. | |
| 2016/0178066 | A1 | * | 6/2016 | Shopland | F16K 1/24 |
| | | | | | 251/286 |
| 2018/0195626 | A1 | | 7/2018 | Han et al. | |
| 2019/0264620 | A1 | * | 8/2019 | Moritani | F16K 27/04 |

OTHER PUBLICATIONS

First Office Action issued May 14, 2025, in connection with Chinese Patent Application No. 202110188113.9, 19 pages.

(56)  References Cited

OTHER PUBLICATIONS

Office Action dated Oct. 14, 2025, in connection with Chinese Application No. 202110188113.9, 17 pages.
Office Action dated Oct. 28, 2025, in connection with Chinese Application No. 202110188112.4, 18 pages.
Office Action dated Nov. 29, 2025, in connection with Chinese Application No. 202110188103.5, 21 pages.

* cited by examiner

52

52

66

67

54

80

55

56

82

58

VALVE WITH UNOBSTRUCTED FLOW PATH HAVING INCREASED FLOW COEFFICIENT

CROSS-REFERENCE TO RELATED APPLICATION(S)

This application is a continuation of application Ser. No. 17/248,856, filed Feb. 10, 2021, which claims priority to U.S. Provisional Patent Application No. 62/976,579, filed Feb. 14, 2020, the disclosures of which are incorporated herein by reference.

TECHNICAL FIELD

The present disclosure relates generally to a valve, and in particular to a triple-offset valve with an unobstructed flow path and having an increased flow coefficient (Cv).

BACKGROUND

Valves typically include a disc that sits in the center of the valve in the flow path and rotates to regulate the rate of flow media. Such valves often are configured with a shaft or stem that passes through the center of the valve and is used to rotate the disc. The shaft/disc assembly may be rotated by an operator/actuator (e.g., quarter turn rotation) between open and closed valve positions. Typically, the disc is positioned in the flow path, with the disc oriented either parallel with the valve flow centerline (open position) or perpendicular to the valve flow centerline (closed position). The obstruction to the flow caused by the presence of the disc and shaft along the valve flow centerline may induce a pressure drop even when the valve is full open in the parallel orientation, thus reducing the maximum achievable flow coefficient (Cv) of the valve. Valves may be configured in a zero offset, double offset or triple offset configuration, with the latter configuration best suited for high-pressure systems requiring low torque, frictionless metal to metal sealing.

SUMMARY

This disclosure relates to a valve with an unobstructed flow path and having an increased flow coefficient.

In one aspect, one embodiment of a valve includes a valve body having first and second ends spaced apart along a longitudinal axis and a central portion disposed between the first and second ends. The first and second ends define first and second flow passageways respectively, and the central portion defines an interior chamber. A stem is rotatably supported by the valve body about a rotation axis. A disc is coupled to the stem. The disc is rotatable within the interior chamber between a closed position, wherein the disc closes one of the first or second flow passageways, and an open position, wherein at least one of the first and second flow passageways is completely unobstructed between the first and second ends of the valve body when projected along the longitudinal axis.

In another aspect, in one embodiment of a valve, the stem includes a first stem portion supported by a top of the valve body and a second stem portion supported by a bottom of the valve body, wherein the first and second stem portions are spaced apart on opposite sides of, and do not project into the first and second flow passageways when projected along the longitudinal axis. The first and second stem portions are co-axial and define a rotation axis.

In another aspect, one embodiment of a method of operating a valve includes rotating a disc in a valve body about a rotation axis between an open position and a closed position, wherein the valve body includes first and second ends spaced apart along a longitudinal axis and a central portion disposed between the first and second ends, wherein the first and second ends define first and second flow passageways respectively, and wherein the central portion defines an interior chamber. The disc closes one of the first or second flow passageways in the closed position, and at least one of the first and second flow passageways is completely unobstructed between the first and second ends of the valve body when projected along the longitudinal axis when the valve is in the open position.

In another aspect, one embodiment of a valve includes a valve body having first and second ends spaced apart along a longitudinal axis and a central portion disposed between the first and second ends, wherein the first end comprises a bore. A valve is moveably disposed in the central portion, wherein the valve is moveable between open and closed positions. A seat ring is disposed in the bore and defines at least in part a flow passageway. A locator interfaces between the seat ring and the body to positionally locate the seat ring relative to the body.

In another aspect, a unibody valve includes a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber. The unibody valve further includes a disc disposed within the interior chamber, wherein the interior chamber includes an enlarged side portion positioned outside of the at least one of the first flow passageway and the second flow passageway projected along the longitudinal axis, wherein the disc is disposed in the enlarged side portion when in an open position.

In another aspect, a valve includes a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber. The valve further includes a stem rotatably supported by the valve body about a rotation axis, wherein the stem includes a polygonal end. The valve further includes a disc disposed within the interior chamber and including a polygonal aperture to receive the polygonal end of the stem.

In another aspect, a valve includes a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber, wherein the first end of the valve body includes a bore. The valve further includes a removable seat disposed in the bore and defining at least in part the first flow passageway.

The various embodiments of the valve, and the methods for the use thereof, provide significant advantages over other valves and methods of manufacture and use. For example and without limitation, the disclosed valve leaves the flow passageway unobstructed and thereby achieves a higher flow coefficient. In addition, the seat ring may be easily replaced, for example if worn or damaged, or if the valve is being reconfigured. The locator ensures that the seat ring is properly located relative to the valve body, such that it is positionally located to interface with the disc in the closed position.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication or interaction between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1A:
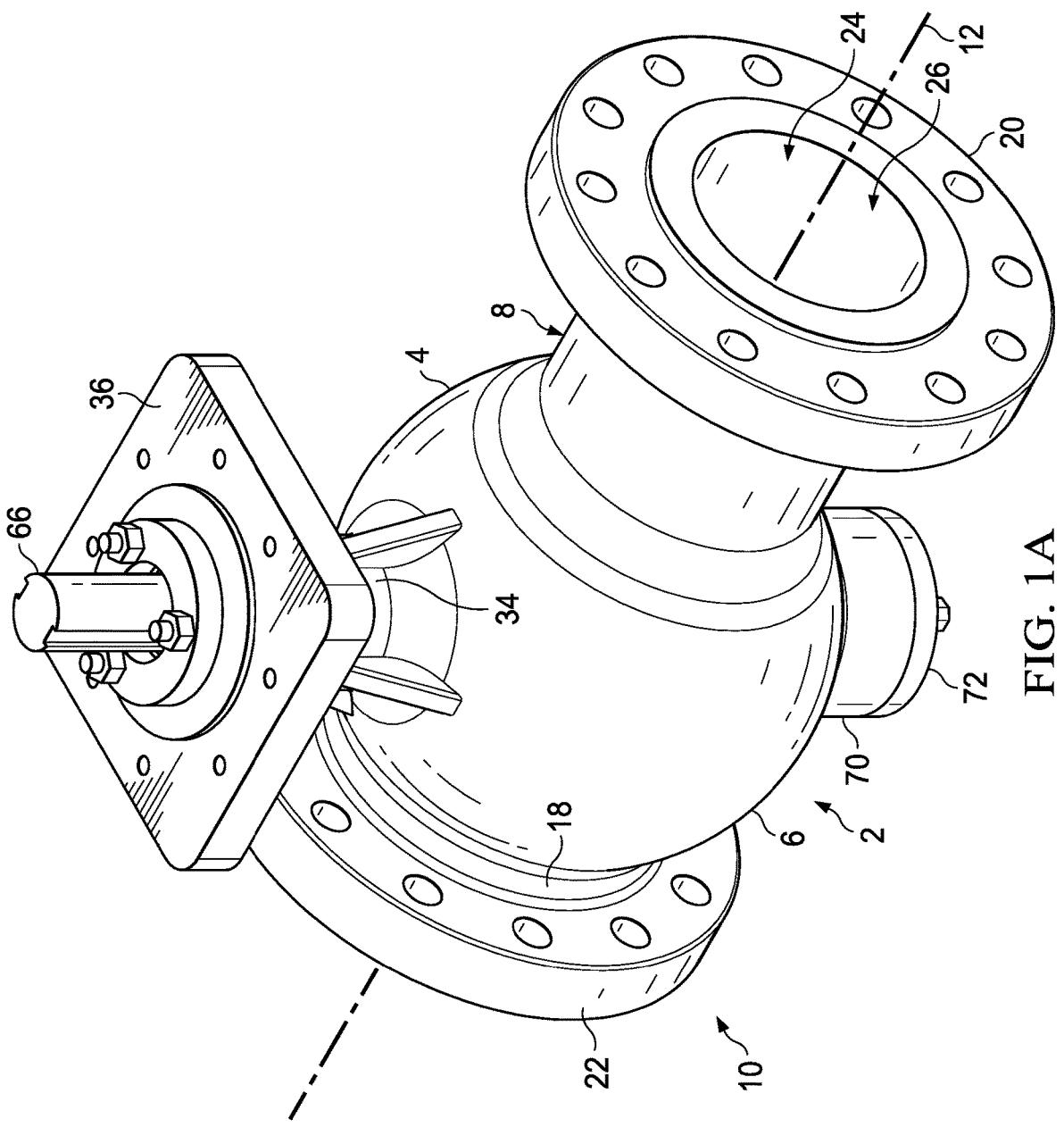
FIG. 1A illustrates a side perspective view of a triple valve assembly in accordance with various embodiments of this disclosure.

FIGS. 1A through 10E, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

It should be understood that the term "plurality," as used herein, means two or more. The terms "outboard" and "inboard" refer to the relative position of different features relative to a common axis or plane. The term "coupled" means connected to or engaged with, whether directly or indirectly, for example with an intervening member, and does not require the engagement to be fixed or permanent, although it may be fixed or permanent (or integral). The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. For example, a "first" diameter may be later referred to as a "second" diameter depending on the order in which they are referred. It should also be understood that designation of "first" and "second" does not necessarily mean that the two components or values so designated are different, meaning for example a first diameter may be the same as a second diameter, with each simply being applicable to separate components. The terms "vertical" and "horizontal" refer to the orientation of various components as shown in the drawings, but with the understanding that those components may be rotated and used in other orientations.

Figure 1B:
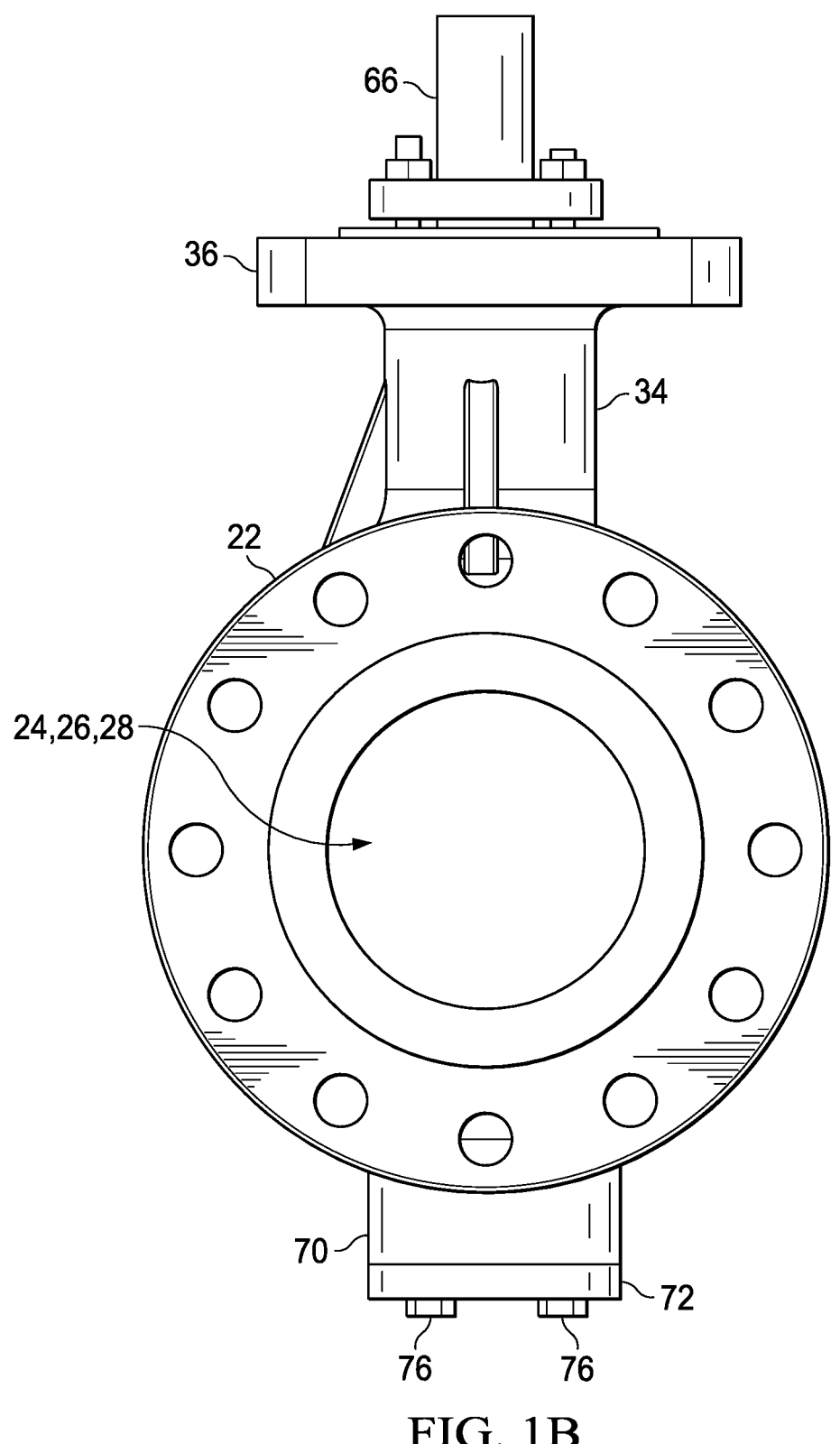
FIG. 1B illustrates a downstream end view of a triple valve assembly in accordance with various embodiments of this disclosure.
Figure 1C:
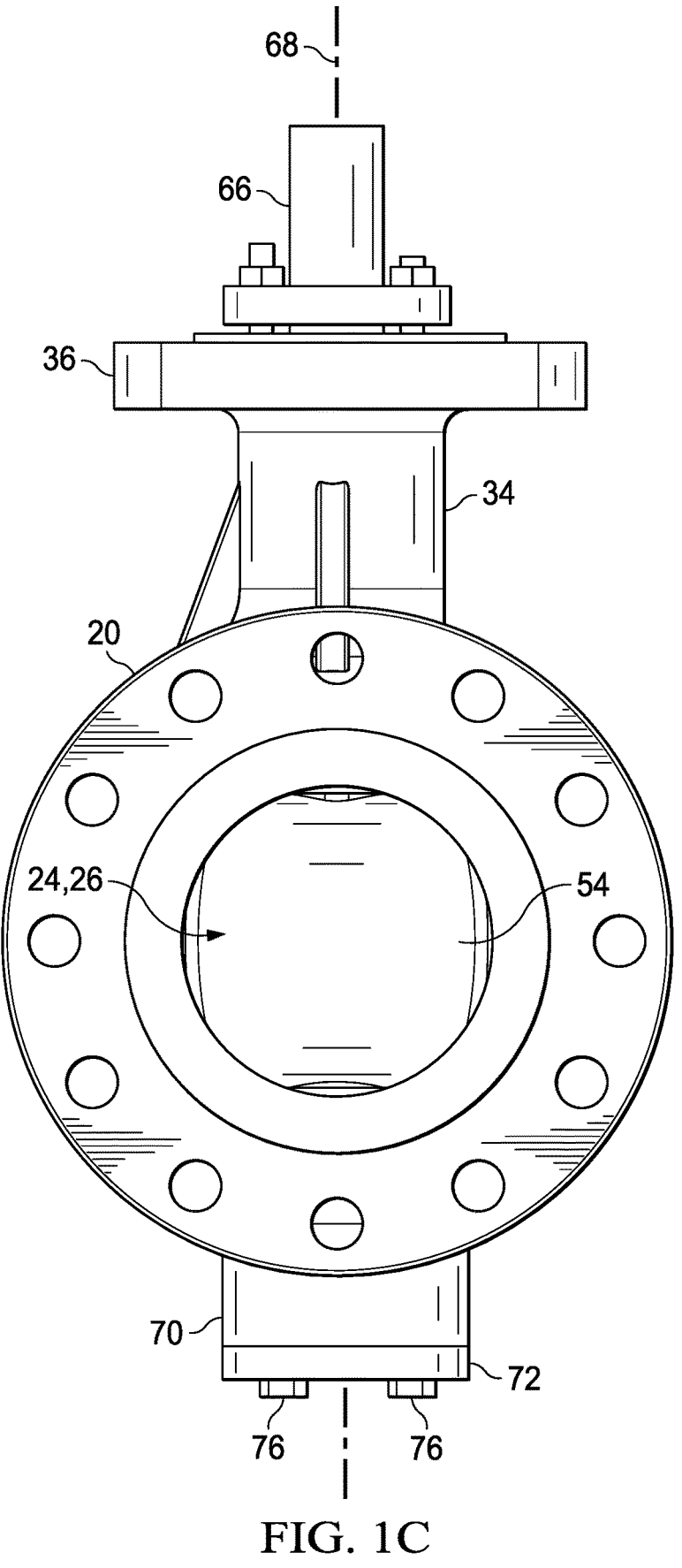
FIG. 1C illustrates an upstream end view of a triple valve assembly in accordance with various embodiments of this disclosure.

FIGS. 1A-1C illustrate an example triple offset valve assembly 2 in accordance with various embodiments of this disclosure. FIG. 1A illustrates a side perspective view of the triple valve assembly 2 in accordance with various embodiments of this disclosure. FIG. 1B illustrates a downstream end view of the triple valve assembly 2 in accordance with various embodiments of this disclosure. FIG. 1C illustrates an upstream end view of the triple valve assembly 2 in accordance with various embodiments of this disclosure.

The triple offset valve assembly 2 includes a one-piece valve body 4 having a central portion 6 and a pair of end portions 8, 10 spaced apart along a longitudinal axis 12 on opposite sides of the central portion. It should be understood that the body may include a plurality of pieces coupled together, including for example and without limitation, a two-piece body, including a lower portion and an upper portion coupled thereto with fasteners. In general, the body and other components of the valve described herein may be made of steel, such as an alloy/carbon steel.

The end portions 8, 10 may have the same, or different lengths. Each end portion includes a tubular portion 16, 18 and an annular flange 20, 22, with the tubular portions defining an interior flow passageway 24 extending along a longitudinal axis 12 between opposite ends of the body. The flow passageway 24 is defined in part by an interior flow passageway 26, 28 formed in each of the end portions. The flow passageways 26, 28 may be cylindrical, defined by the interior surface of the end portions. The first and second flow passageways 26, 28 are coaxial along the longitudinal axis 12 in one embodiment, and have respective first and second cross-sectional areas defined orthogonal to the longitudinal axis 12, with the first cross-sectional area being the same as the second cross-sectional area in one embodiment.

A neck portion 34, which may be cylindrical, extends upwardly from the central portion. The neck portion includes an upper flange 36, shown as a rectangular plate, defining a top surface defining a top of the body. As shown in FIG. 1C, a disc 54 within the interior of the valve body 4 is coupled to a first shaft 66 and a second shaft 64 (not shown), which are coaxially aligned and rotatably mounted to the valve body 4 at upper and lower locations about a rotation axis 68. The stem 66 extends upwardly through a passageway of the neck portion 34, with an upper end thereof positioned to be coupled to an operator/actuator.

The stem 64 (not shown) is rotatably supported by a bottom hub 70 of the body, with a cover 72 (and bearing/bushing) secured thereto with fasteners 76 to support the stem 64. One or more bearings, seals, packing and/or bushings, collectively mounting members, may support the stems 64, 66 in the valve body 4, with the upper stem 66 extending upwardly through the neck portion 34. In this way, the disc shaft includes the first stem portion 66 supported by the valve body 4 and coupled to a top of the disc 54, and the second stem portion 64 supported by the valve body 4 and coupled to a bottom of the disc 54. The first and second stem portions 66, 64 are spaced apart on opposite sides of, and do not project into, the first and second flow passageways 26, 28 projected along the longitudinal axis 12.

Figure 2A:
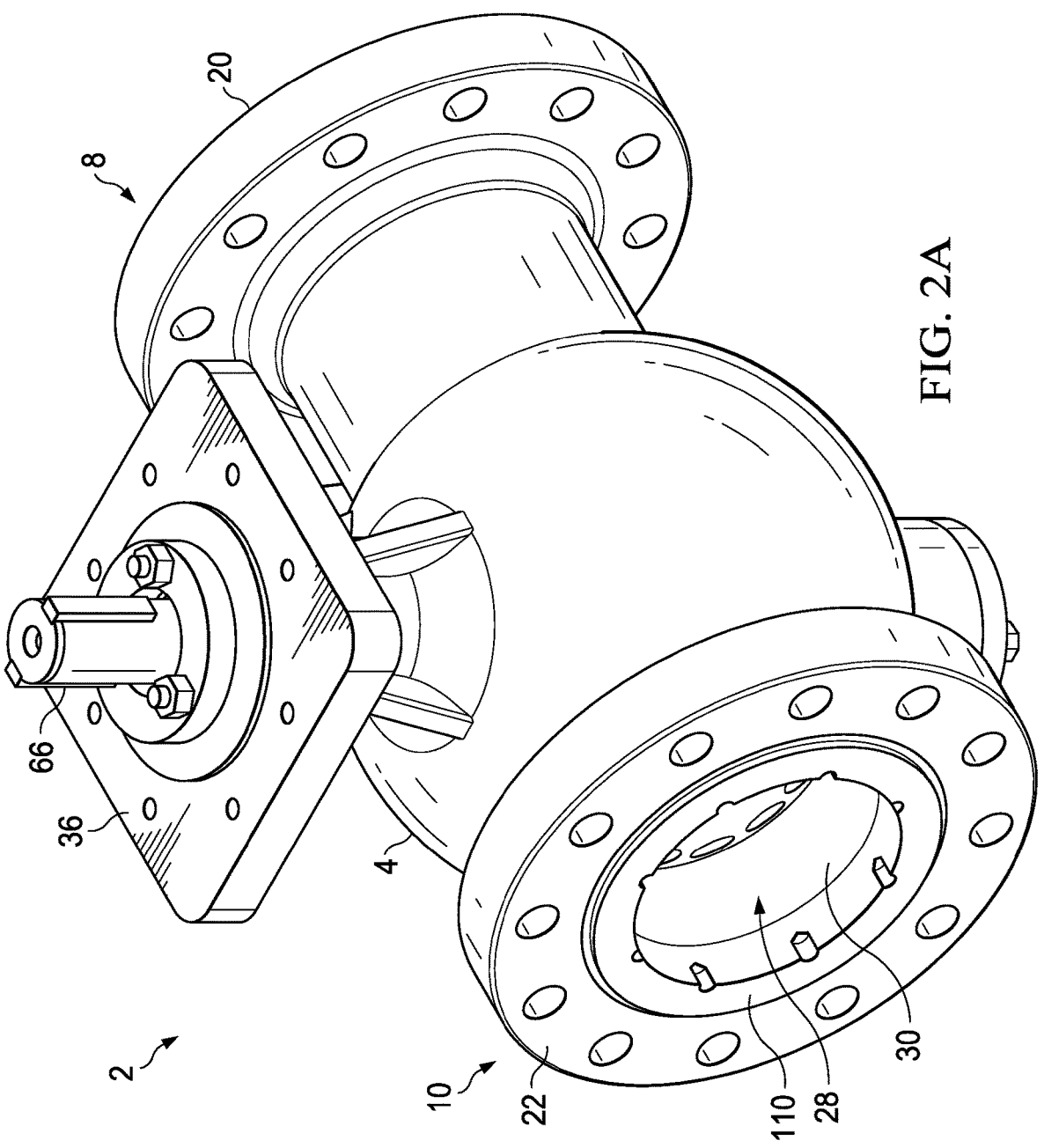
FIG. 2A illustrates a side perspective view of a triple valve assembly including a seat ring in accordance with various embodiments of this disclosure.
Figure 2B:
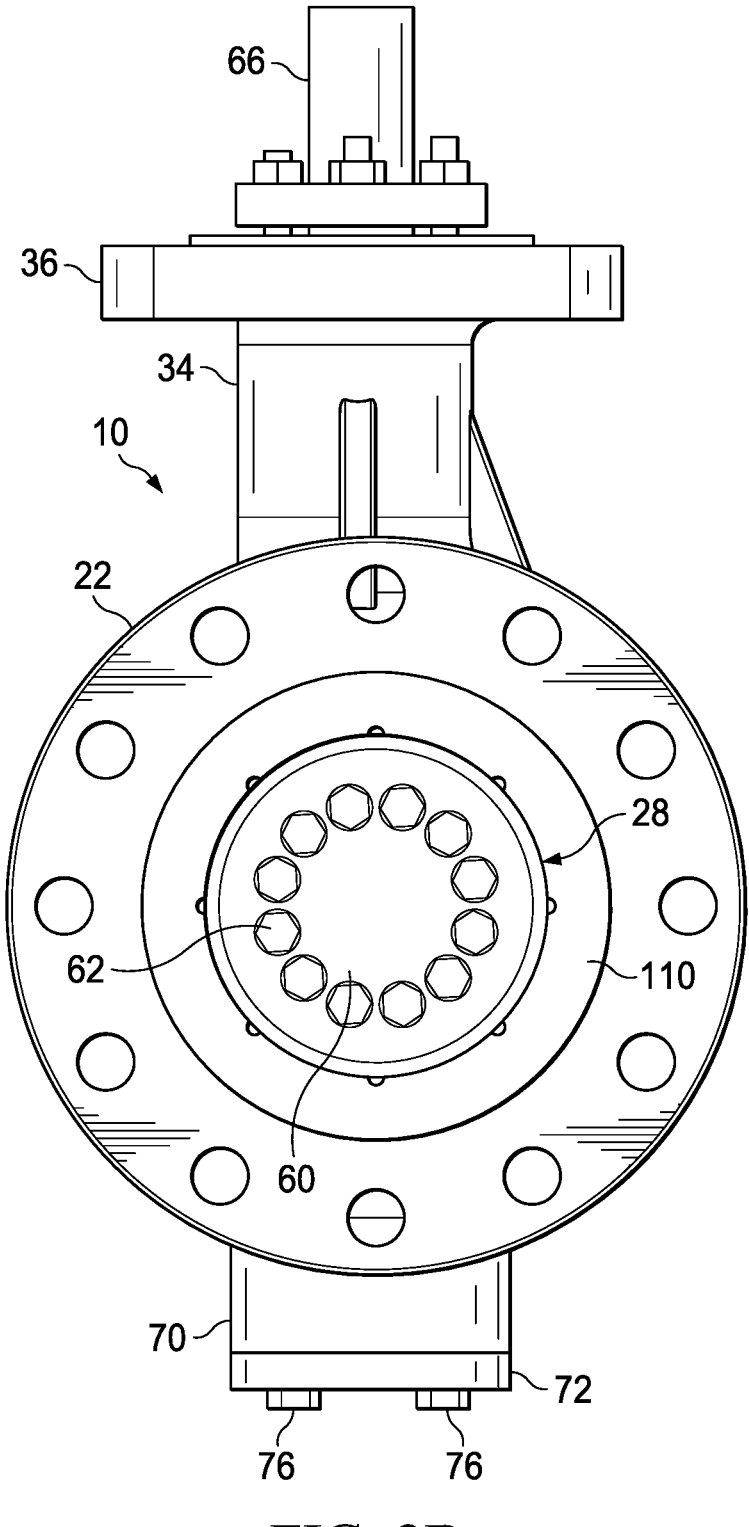
FIG. 2B illustrates a downstream end view of a triple valve assembly including a seat ring in accordance with various embodiments of this disclosure.
Figure 2C:
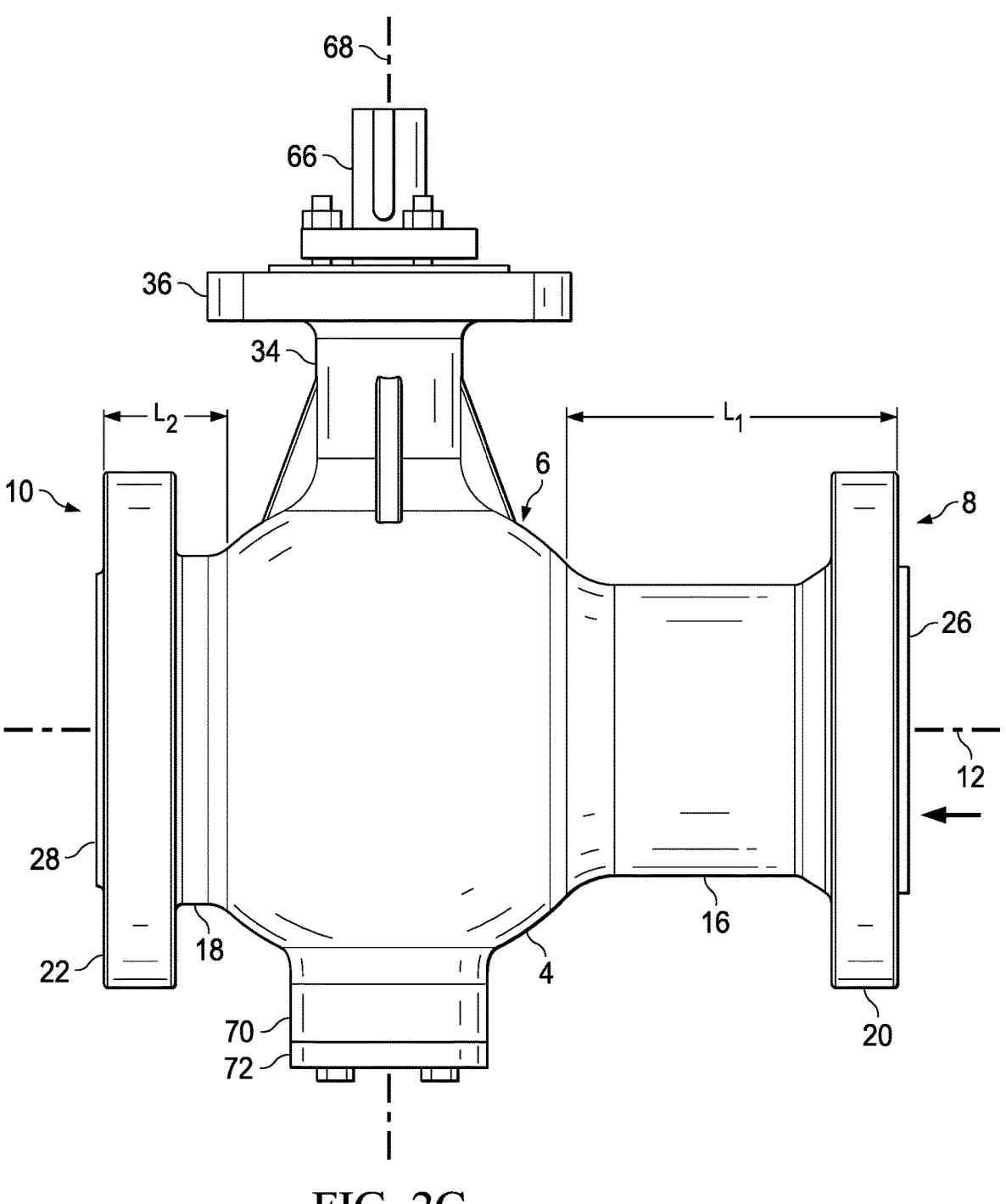
FIG. 2C illustrates a side view of a triple valve assembly including a seat ring in accordance with various embodiments of this disclosure.

FIGS. 2A-2C illustrate an example triple valve assembly 2 including a removable seat ring 30 in accordance with various embodiments of this disclosure. FIG. 2A illustrates a side perspective view of the triple valve assembly 2 including the seat ring 30 in accordance with various embodiments of this disclosure, FIG. 2B illustrates a downstream end view of the triple valve assembly 2 including the seat ring 30 in accordance with various embodiments of this disclosure, and FIG. 2C illustrates a side view of the triple valve assembly 2 including the seat ring 30 in accordance with various embodiments of this disclosure.

In some embodiments, the seat ring 30 is installed in the downstream end portion 10, with the seat ring 30 defining the flow passageway 28 having a cross-sectional area the same as, and coaxial with, the cross-sectional area of the flow passageway 26 defined by the opposite upstream end portion 8 configured without a seat ring. In some embodiments, the seat ring 30 may be omitted, with the flow passageways both defined by the valve body 4. A retainer ring 110 and sealing component 112 (not shown) are coupled to the valve body 4 to secure the seat ring 30 after it is positionally located. The retainer ring 110 secures the seat ring 30 in place, with the sealing component 112 clamped between the retainer ring 110 and an end of the seat ring 30. In some embodiments, the shape of the seat ring 30 with respect to the shape of the flow passageway 28 allows for self-centering of the seat. In some embodiments, the retainer ring 110 is threaded to an interior portion of the flange 22 to tighten and secure the retainer ring 110 and the seat ring 30 to the valve body 4. Since the seat ring 30 is a separate installable component from the valve assembly 2, and can be removed by first loosening and removing the retainer ring 110, easier maintenance and/or replacement of the seat ring 30 or the retainer ring 110 is provided.

As shown in FIG. 2B, at the end 10 near the installation of the seat ring 30 and retainer ring 110, the passageway 28 is sealed by the disc 54 when the valve assembly 2 is in the closed position. In some embodiments, the disc 54 includes a seal retainer disc 60 and a plurality of fasteners 62, e.g., bolts and washers, that secure the retainer disc 60 to the disc 54.

As shown in FIG. 2C, the flow passageways 26, 28 may be cylindrical, defined by the interior surface of the end portions 8, 10, for example defined by a diameter (D) of the passageway 26, 28. A flow media, e.g., fluids, flow through the valve from the upstream end portion 8 to the downstream end portion 10, with the upstream end portion 8 having a greater length (L1) than the length (L2) of the downstream end portion 10. It should be understood, however, that the valve may be bi-directional, and/or that the flow may proceed in the opposite direction, with the end portion 8 being the downstream end portion and the end portion 10 being the upstream end portion. The first and second flow passageways 26, 28 are coaxial along the longitudinal axis 12 in one embodiment, and have respective first and second cross-sectional areas defined orthogonal to the longitudinal axis 12, with the first cross-sectional area being the same as the second cross-sectional area in one embodiment.

Figure 3A:
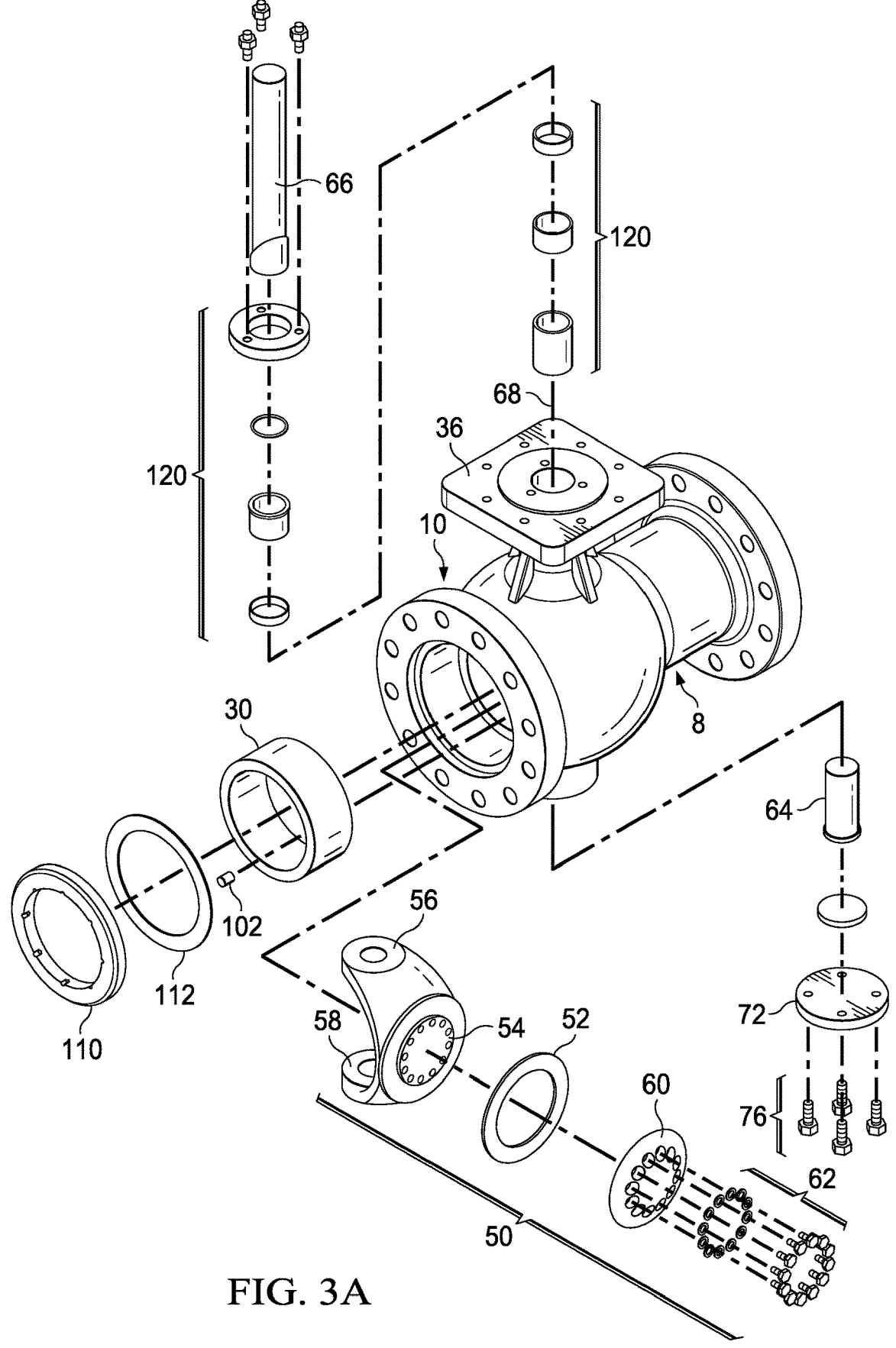
FIG. 3A illustrates an exploded top perspective view of a triple valve assembly in accordance with various embodiments of this disclosure.
Figure 3B:
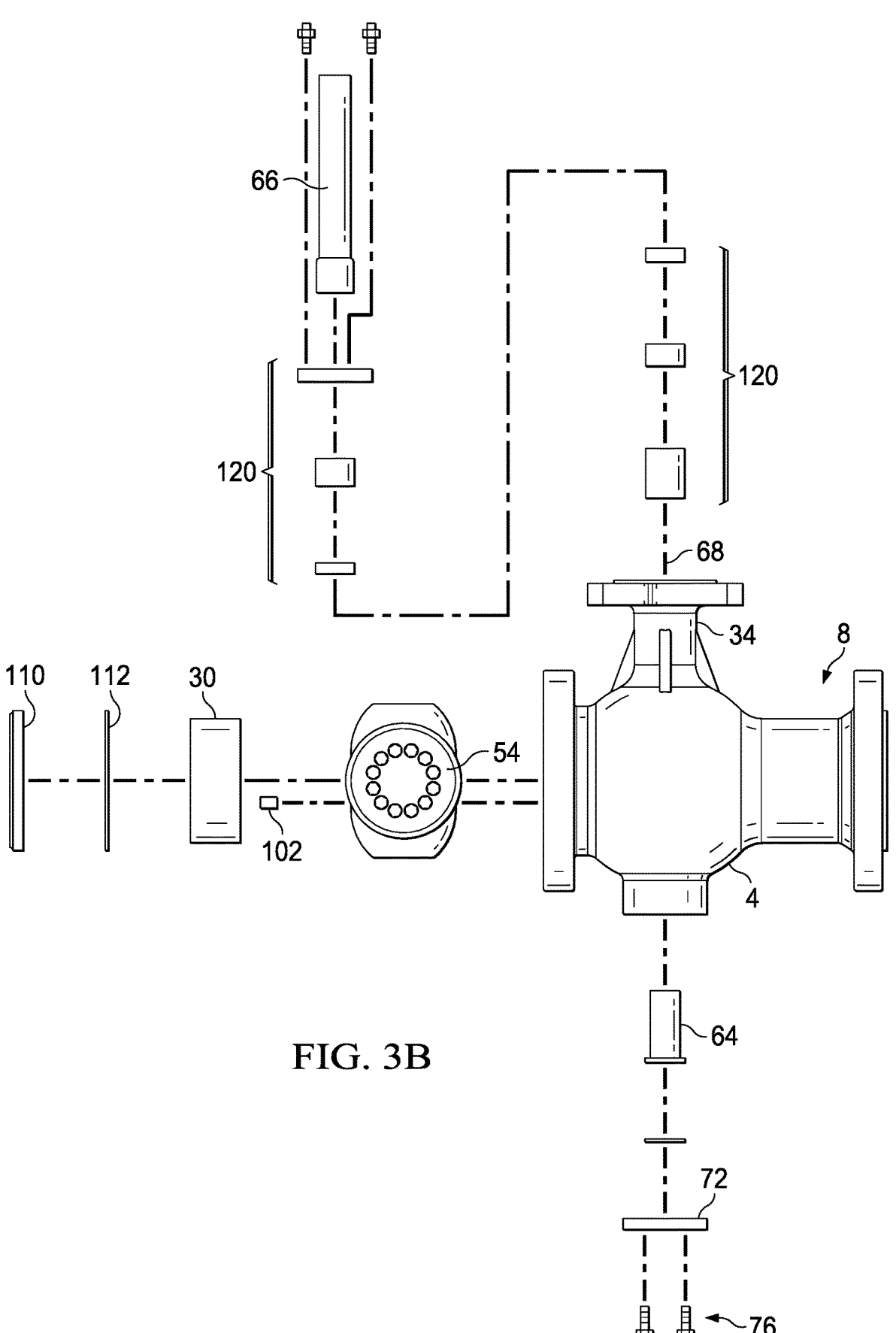
FIG. 3B illustrates an exploded side view of a triple valve assembly in accordance with various embodiments of this disclosure.
Figure 3C:
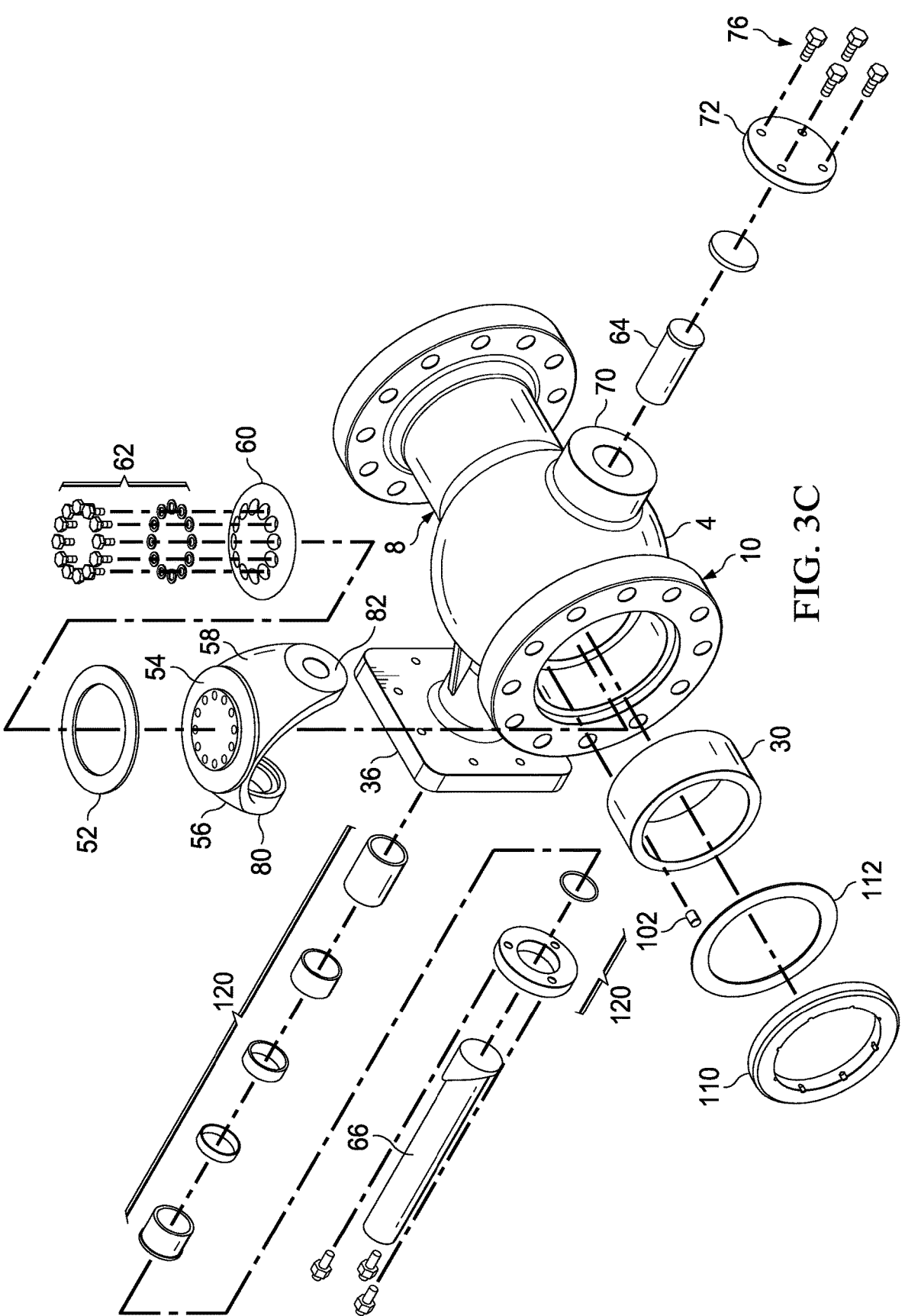
FIG. 3C illustrates an exploded bottom perspective view of a triple valve assembly in accordance with various embodiments of this disclosure.

FIGS. 3A-3C illustrate example exploded views of the triple valve assembly 2 in accordance with various embodiments of this disclosure. FIG. 3A illustrates an exploded top perspective view of the triple valve assembly 2 in accordance with various embodiments of this disclosure. FIG. 3B illustrates an exploded side view of the triple valve assembly 2 in accordance with various embodiments of this disclosure. FIG. 3C illustrates an exploded bottom perspective view of the triple valve assembly 2 in accordance with various embodiments of this disclosure.

The triple valve assembly 2 includes a disc assembly 50. The disc assembly 50 is configured as a laminate structure that includes an elliptical seal ring 52, the seal carrier or disc 54 with two disc arms 56, 58 that conform to the outboard diameter of the valve, a seal retainer disc 60 and a plurality of fasteners 62 (bolts and washers) that secure the retainer disc 60 to the disc 54, with the elliptical seal ring 52 clamped therebetween. In this way, the seal ring 52 is removably coupled to the disc 54, such that it may be replaced if worn or damaged. For example, an operator may remove the fasteners 62 and the seal ring 52 and install a new seal ring, securing the seal ring with the seal retainer disc 60 and fasteners 62. The seal ring 52 engages a valve seat created by the seat ring 30 when the valve and disc 54 are in the closed position. It should be understood that, in some embodiments, the disc assembly 50, including the disc 54, arms 56, 58, stems 64, 66, and sealing element 52, may be made as a single piece, or the disc 54, arms 56, 58, and sealing element 52 may be made as a single piece, which is connected to the stems 64, 66. The gaskets and sealing elements may be made of graphite and/or commercial grade stainless steel.

The disc assembly 50 is coupled to the pair of stems/shafts 64, 66, which are coaxially aligned and rotatably mounted to the valve body at upper and lower locations about the rotation axis 68. The stem 66 extends upwardly through the neck portion 34, with an upper end thereof positioned to be coupled to an operator/actuator. The stem 64 is rotatably supported by a bottom hub 70 of the body, with a cover 72 (and bearing/bushing) secured thereto with fasteners 76 to support the stem 64. One or more bearings, seals, packing and/or bushings, collectively stem seal members 120, may support the stems in the valve body, with the upper stem extending upwardly through the neck portion. In this way, the assembly 2 includes a first stem or shaft 66 supported by the valve body and coupled to a top of the disc 54, and includes a second stem or shaft 64 supported by the valve body and coupled to a bottom of the disc 54. The first and second stem portions 66, 64 are spaced apart on opposite sides of, and do not project into, the first and second flow passageways 26, 28 projected along the longitudinal axis 12. In some embodiments, the connections of the stems 66, 64 to the disc are polygonal, such that the openings or apertures in the disc 54 at the disc arms 56, 58 are in a polygonal shape that matches the shapes of the corresponding shafts 64, 66.

The polygonal connections between the shafts 64, 66 and disc 54 provide 100% torque transmission, and provides during installation verification that the shafts 64, 66 are correctly installed into the openings of the disc 54, since the matching polygonal shapes of the shafts 64, 66 and the openings of the disc 54 ensure that the shafts 64, 66 are installed in a proper orientation.

The laminate disc assembly 50, having a covered dome shape, and the seal ring 52 in particular, or elliptical profile, mating with the concavely shaped valve seat, having a corresponding elliptical profile, defined by the seat ring 30. The configuration of the disc assembly 50 is designed to allow frictionless opening and closing of the disc assembly to reduce the required torque needed to move or stroke the valve between open and closed positions. The seal ring 52 is installed onto the disc and secured in place by a series of bolts/fasteners 62, as disclosed above. The disc 54 includes the first and second arms 56, 58, which are situated tangentially to the disc, thereby ensuring that the position of the arms 56, 58 is outside the flow path of the media, or flow passageways 26, 28 projected along the longitudinal axis 12. The disc arms 56, 58 are mounted on the stems/shafts 66, 64, with the stem/shafts 66, 64 being rotated by an operator or actuator, which rotates the disc assembly 50 between the closed position and the open position.

The valve may be operated by any combination of a hand wheel, gear operator or actuator. The actuator may be powered either electrically or pneumatically and may include a gearbox for applications where high torque is required to operate the valve.

After the disc assembly 50 is installed, the seat ring 30 may be inserted into a bore defined by the valve body 4 and positionally located (e.g., non-rotatably) relative to the valve body 4 and bore with a locator 102. The seat ring 30 thereafter defines at least in part the flow passageway 28. The locator 102 interfaces between the seat ring 30 and the body 4. After the locator pin 102 is installed, the seat ring 30 is non-rotatably located or positioned relative to the valve body 4. The locator pin 102 ensures that the seat ring is installed into the body 4 so that the valve seat offsets are oriented in the same direction as the seal ring 52 of the disc 54. Without the locator pin 102, the seat ring may inadvertently be installed improperly, which would preclude sealing against the disc 54 and seal ring 52. By making the seat ring 30 non-integral with the valve body 4, the seat ring may be formed, for example by machining, separately from the valve body, and the seat ring may be easily replaced if damaged. It should be understood that the valve body 4, seat ring 30, and locator 102 may be used in different types of valves other than a valve, including for example and without limitation, gate valves, ball valves, etc.

A retainer ring 110 and sealing component 112 are coupled to the valve body 4 to secure the seat ring 30 after it is positionally located. The retainer ring 110 secures the seat ring 30 in place, with the sealing component 112 clamped between the retainer ring and the end of the seat ring 30. An outboard end of the locator pin 102 is covered by the sealing component and retainer ring, such that it may not be removed. The retainer ring 110 and seat ring 30 have inner surface diameters on the downstream end that match the inner diameter of the valve on the upstream end, with the flow passageways defined thereby being aligned and co-axial, in order to reduce pressure drop across the valve, thereby maximizing the flow coefficient (Cv). The sealing component 112 eliminates the potential for a leak path between the body 4, seat ring 30, and retainer ring 110 when the valve is pressurized by the flow media, including for example a fluid.

Figure 4A:
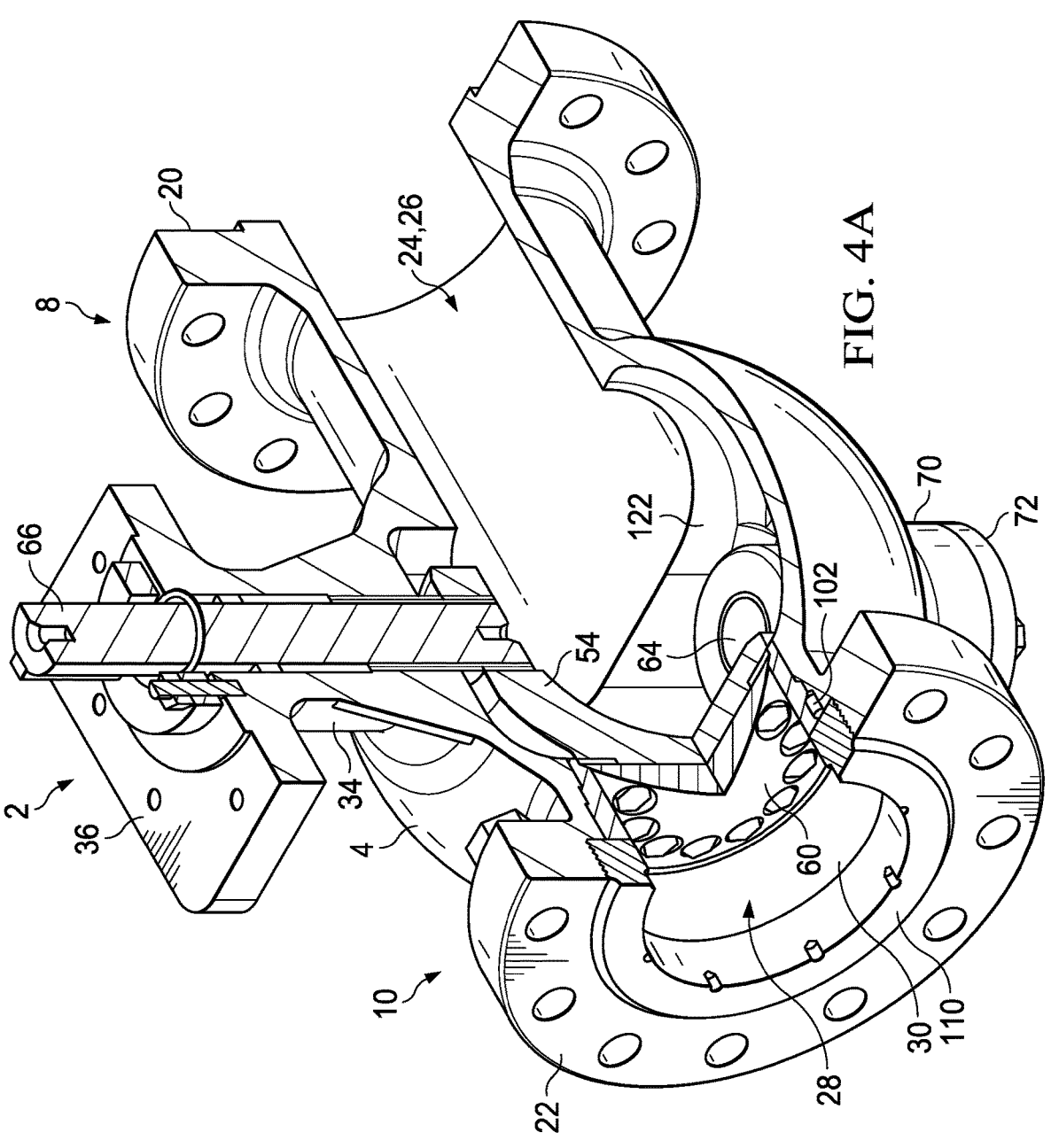
FIG. 4A illustrates a cross-sectional perspective view of a triple valve assembly in a closed position in accordance with various embodiments of this disclosure.
Figure 4B:
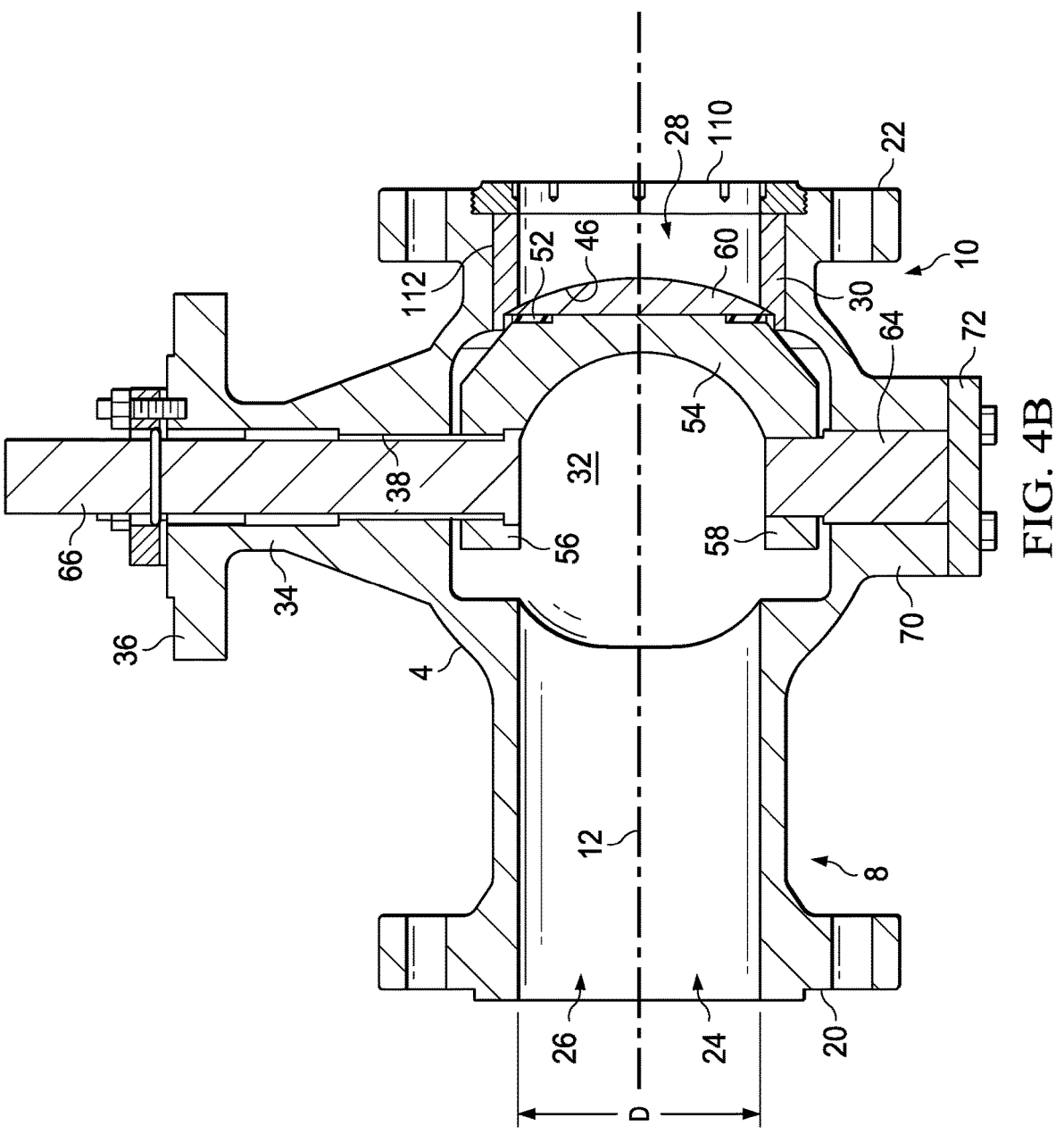
FIG. 4B illustrates a cross-sectional side view of a triple valve assembly in a closed position in accordance with various embodiments of this disclosure.
Figure 4C:
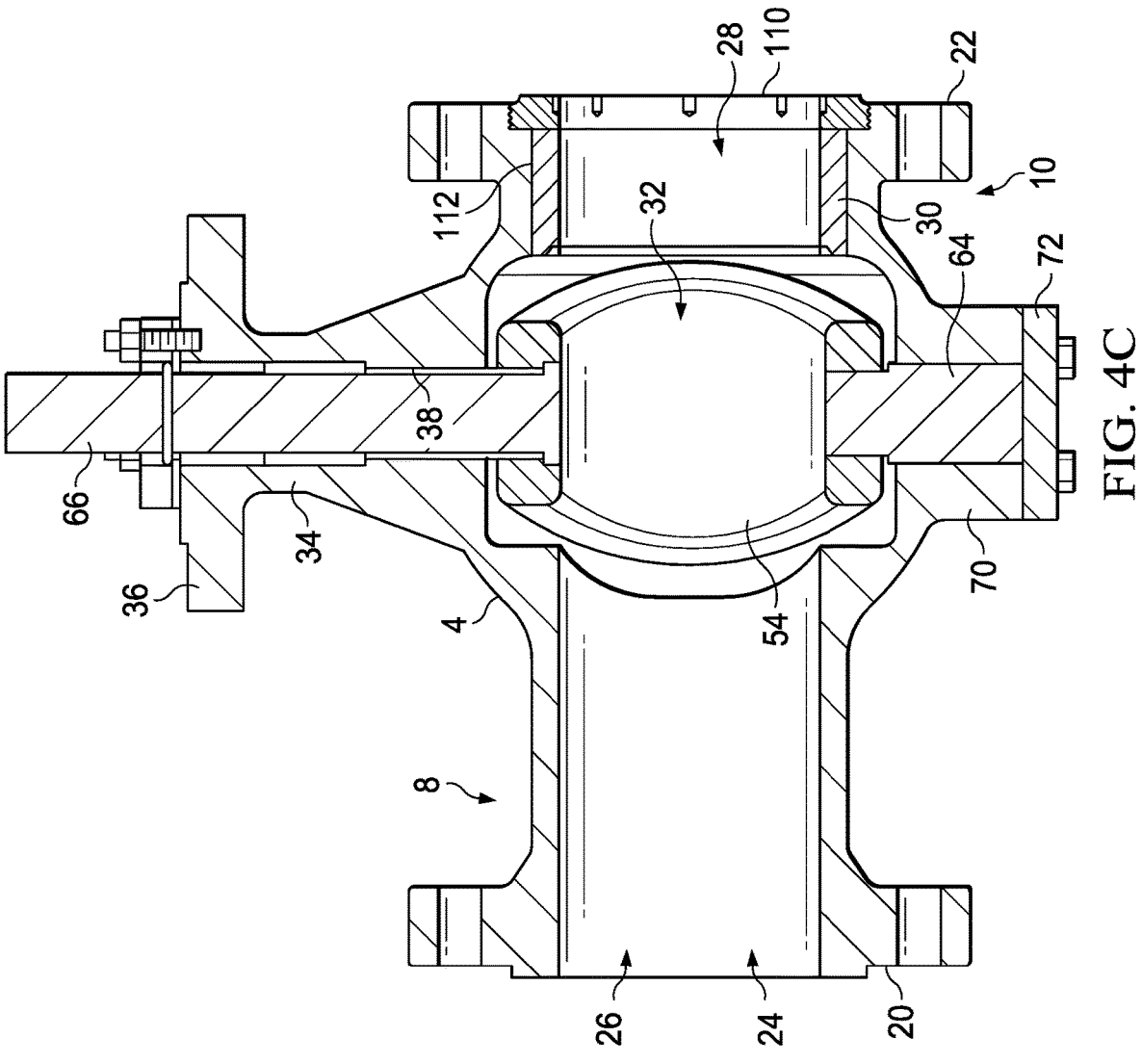
FIG. 4C illustrates a cross-sectional side view of a triple valve assembly in an open position in accordance with various embodiments of this disclosure.
Figure 4D:
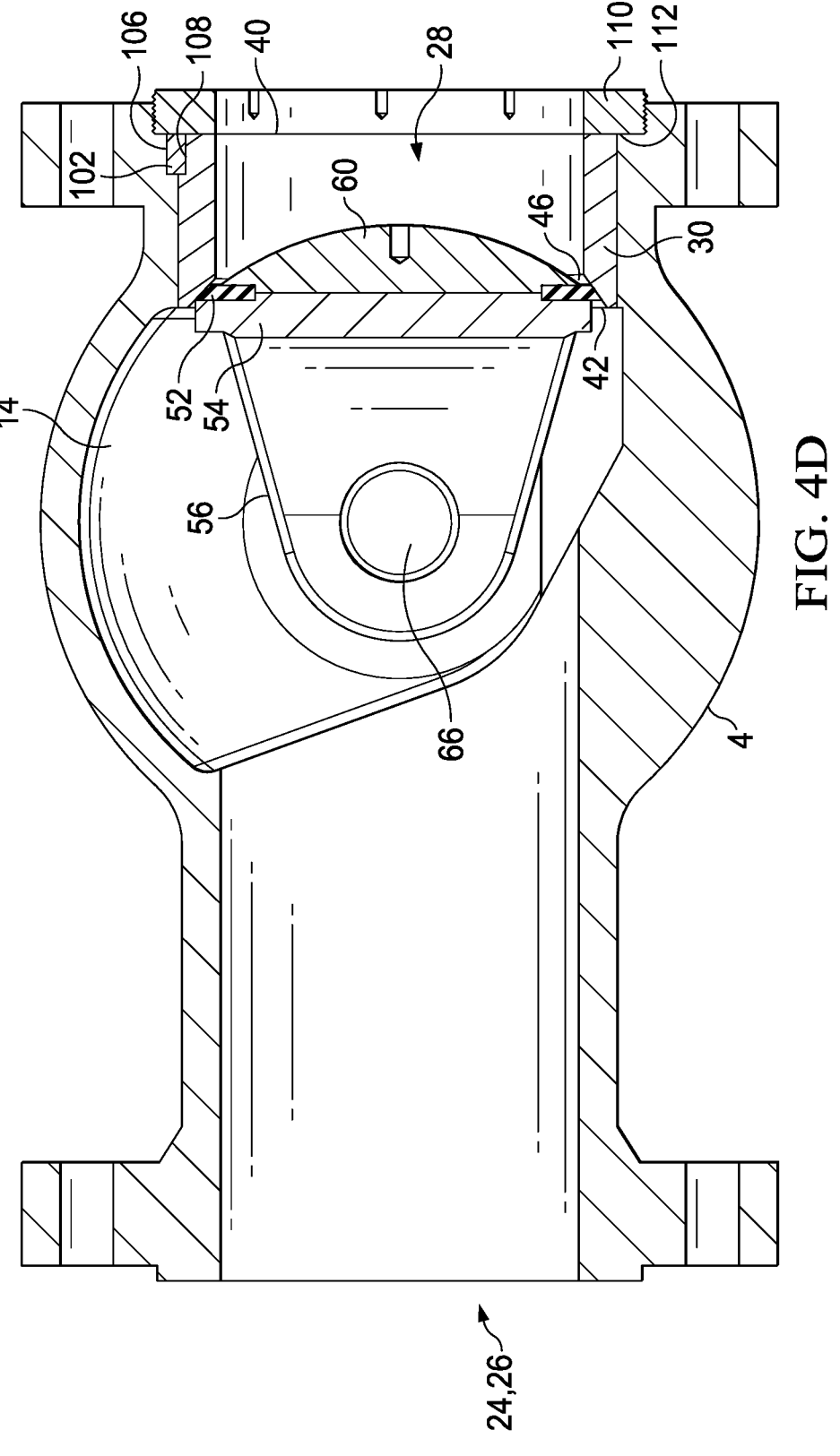
FIG. 4D illustrates a cross-sectional top view of a triple valve assembly in a closed position in accordance with various embodiments of this disclosure.
Figure 4E:
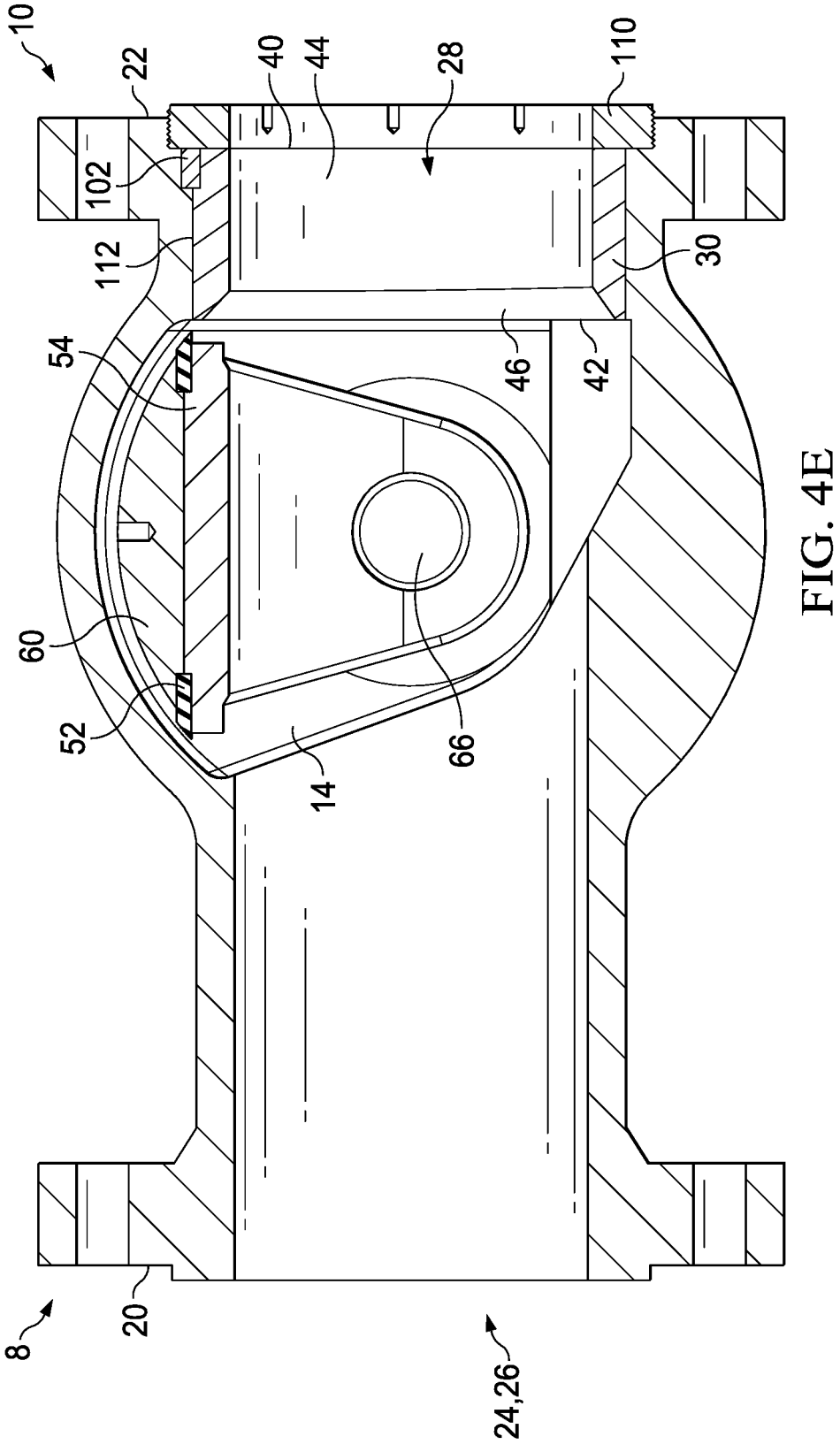
FIG. 4E illustrates a cross-sectional top view of a triple valve assembly in an open position in accordance with various embodiments of this disclosure.

FIGS. 4A-4E illustrate cross-sectional views of the triple valve assembly 2 in accordance with various embodiments of this disclosure. FIG. 4A illustrates a cross-sectional perspective view of the triple valve assembly 2 in a closed position in accordance with various embodiments of this disclosure. FIG. 4B illustrates a cross-sectional side view of the triple valve assembly 2 in a closed position in accordance with various embodiments of this disclosure. FIG. 4C illustrates a cross-sectional side view of the triple valve assembly 2 in an open position in accordance with various embodiments of this disclosure. FIG. 4D illustrates a cross-sectional top view of the triple valve assembly 2 in a closed position in accordance with various embodiments of this disclosure. FIG. 4E illustrates a cross-sectional top view of the triple valve assembly 2 in an open position in accordance with various embodiments of this disclosure.

Various embodiments of the triple valve assembly 2 include a central portion 6 defining an interior chamber 32 or cavity. The flow passageways 26, 28 may be cylindrical, defined by the interior surface of the end portions 8, 10, for example defined by a diameter (D) of the passageway 26, 28. A flow media, e.g., fluids, flow through the valve from the upstream end portion 8 to the downstream end portion 10. It should be understood, however, that the valve may be bi-directional, and/or that the flow may proceed in the opposite direction, with the end portion 8 being the downstream end portion and the end portion 10 being the upstream end portion. The first and second flow passageways 26, 28 are coaxial along the longitudinal axis 12 in one embodiment, and have respective first and second cross-sectional areas defined orthogonal to the longitudinal axis 12, with the first cross-sectional area being the same as the second cross-sectional area in one embodiment.

In some embodiments, a seat ring 30 is installed in the downstream end portion 10, with the seat ring defining the flow passageway 28 having a cross-sectional area the same as, and coaxial with, the cross-sectional area of the flow passageway 26 defined by the opposite upstream end portion 8 configured without a seat ring. In other embodiments, the seat ring 30 may be omitted, with the flow passageways both defined by the valve body. The interior chamber 32 includes a belly pocket or an enlarged side portion 14 positioned outside of at least one of the first and second flow passageways 26, 28, and preferably both when configured with the same diameter, projected along the longitudinal axis 12. The neck portion 34 defines an interior passageway 38 extending between the cavity and the top surface.

In some embodiments, the seat ring 30 is disposed in one of the end portions, e.g., the downstream end portion 10. The seat ring has a tubular or cylindrical shape, with an outboard end 40 and an inboard end 42. The inner circumferential surface 44 of the seat ring defines in part the flow passageway 28, and is aligned with and has the same diameter as the inner circumferential surface of the other end portion, which defines the flow passageway 26, such that the flow passageways 26, 28 define the same cross-section when projected along the longitudinal axis. The inboard end 42 of the seat ring defines an elliptical seating surface, or valve seat 46, which is non-integral with the valve body and does not obstruct the flow path. Before the seat ring 30 is installed, the interior passageway of the outboard end portion 10 of the valve body is configured with an oversized diameter to accommodate the seat ring 30 (e.g., the outer diameter thereof), which also provides additional space and allows for easier assembly of the valve internal components prior to the seat ring 30 being installed in the end portion 10. It should be understood in other embodiments, the seat ring 30 may be omitted, with the flow passageway 26 and valve seat 46 being formed integrally in the valve body.

The disc assembly includes the elliptical seal ring 52, the disc 54 with two disc arms 56, 58 that conform to the outboard diameter of the valve, and the seal retainer disc 60. The disc 54 is coupled to the pair of stems/shafts 64, 66, which are coaxially aligned and rotatably mounted to the valve body at upper and lower locations about the rotation axis 68. The stem 66 extends upwardly through the passageway 38 of the neck portion, with an upper end thereof positioned to be coupled to an operator/actuator. The stem 64 is rotatably supported by the bottom hub 70 of the body, with the cover 72. The first and second stem portions 66, 64 are spaced apart on opposite sides of, and do not project into, the first and second flow passageways 26, 28 projected along the longitudinal axis 12.

The seat ring 30 defines at least in part the flow passageway 28. In various embodiments, the seat ring 30 is self-centering due to the shape of the seat ring 30 and the internal profile of the valve. Additionally, as shown in FIG. 4E, the locator 102 interfaces between the seat ring 30 and the body 4 to facilitate placement of the seat ring 30. In one embodiment, the locator 102 is configured as a locator pin, which is disposed in a first opening 106 of the valve body 4 and a second opening 108 disposed in an outer surface of the seat ring 30. In other words, the seat ring 30 is non-rotatably/positionally located such that the partial openings 106, 108 formed in each of the valve body 4 and seat ring 30 are aligned to form an opening sized and shaped to receive the locator pin 102. After the pin 102 is installed, the seat ring 30 is non-rotatably located or positioned relative to the valve body 4. The locator pin 102 ensures that the seat ring is installed into the body so that the valve seat offsets are oriented in the same direction as the seal ring 52 of the disc 54. As described herein, by making the seat ring 30 non-integral with the valve body, the seat ring may be formed, for example by machining, separately from the valve body, and the seat ring may be easily replaced if damaged.

The retainer ring 110 and sealing component 112 are coupled to the valve body 4 to secure the seat ring 30 after it is positionally located. In various embodiments, the retainer ring 110 is threaded into an interior circumferential surface of the flange 22 of the end portion 10 of the valve body 4 to secure the seat ring 30 in place, with the sealing component 112 clamped between the retainer ring 110 and the end of the seat ring 30. An outboard end of the locator pin 102 is covered by the sealing component 112 and retainer ring 110, such that it may not be removed unless intended to be removed by a replacement operation.

In operation, a method of operating the valve includes rotating the disc 54 in the valve body 4 about the rotation axis 68 between the open position and the closed position, and vice versa. As shown in FIGS. 4A, 4B, and 4D, the disc 54 closes the flow passageways 28, 24 in the closed position, with the seal ring 52 engaging the valve seat 46 when the valve and disc are in the closed position. As shown in FIGS. 4C and 4E, when the disc 54 rotates about the rotation axis 68 to the open position, at least one of the first and second flow passageways 26, 28 are completely unobstructed between the first and second ends of the valve body when projected along the longitudinal axis 12 when the valve is in the open position. In various embodiments, the disc 54 is rotated within the interior chamber 32, wherein during rotation the first and second stem portions 66, 64 are spaced apart on opposite sides of, and do not project into, the first and second flow passageways 26, 28 projected along the longitudinal axis 12. In the open position, the flow medium, for example a fluid such as a liquid, may flow through the flow passageway 24. Because the flow passageway 24 is unobstructed by the disc 54 and stems 64, 66, the flow coefficient (Cv) is maximized, and can be up to 5 times greater than conventional valves. When in the open position, the disc 54 moves into a belly pocket of the valve body 4 defined by the unibody internal profile of the triple valve assembly 2, such that the flow path is unobstructed, allowing for the increased flow coefficient and piggability of the triple valve assembly 2. Additionally, since the shafts 64, 66 are separate shafts that do not run across the interior of the valve body 4, the shafts 64, 66 also do not obstruct the flow paths.

Figure 5A:
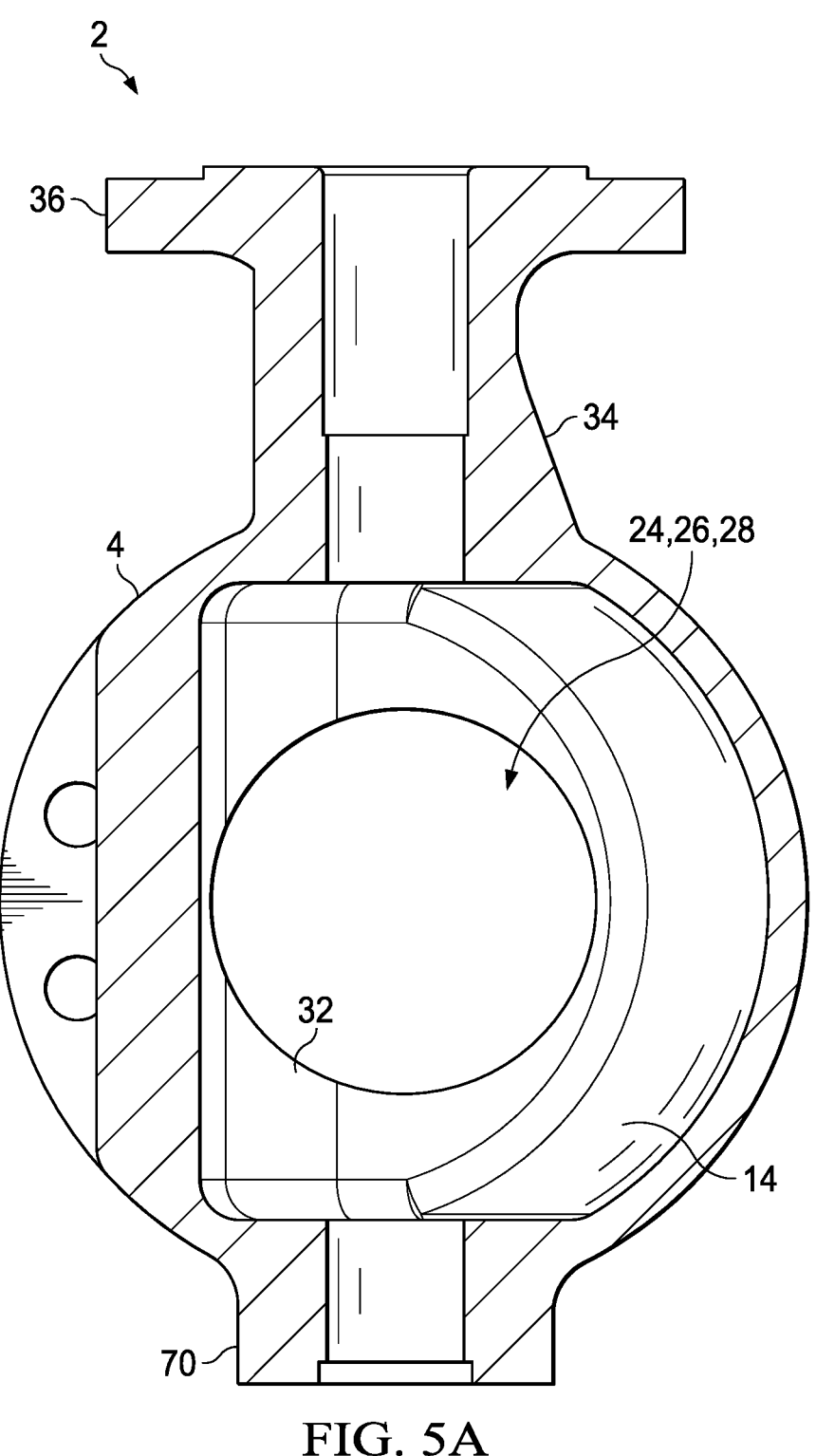
FIG. 5A illustrates a cross-sectional side view of a triple valve assembly showing an internal profile of a valve body in accordance with various embodiments of this disclosure.
Figure 5B:
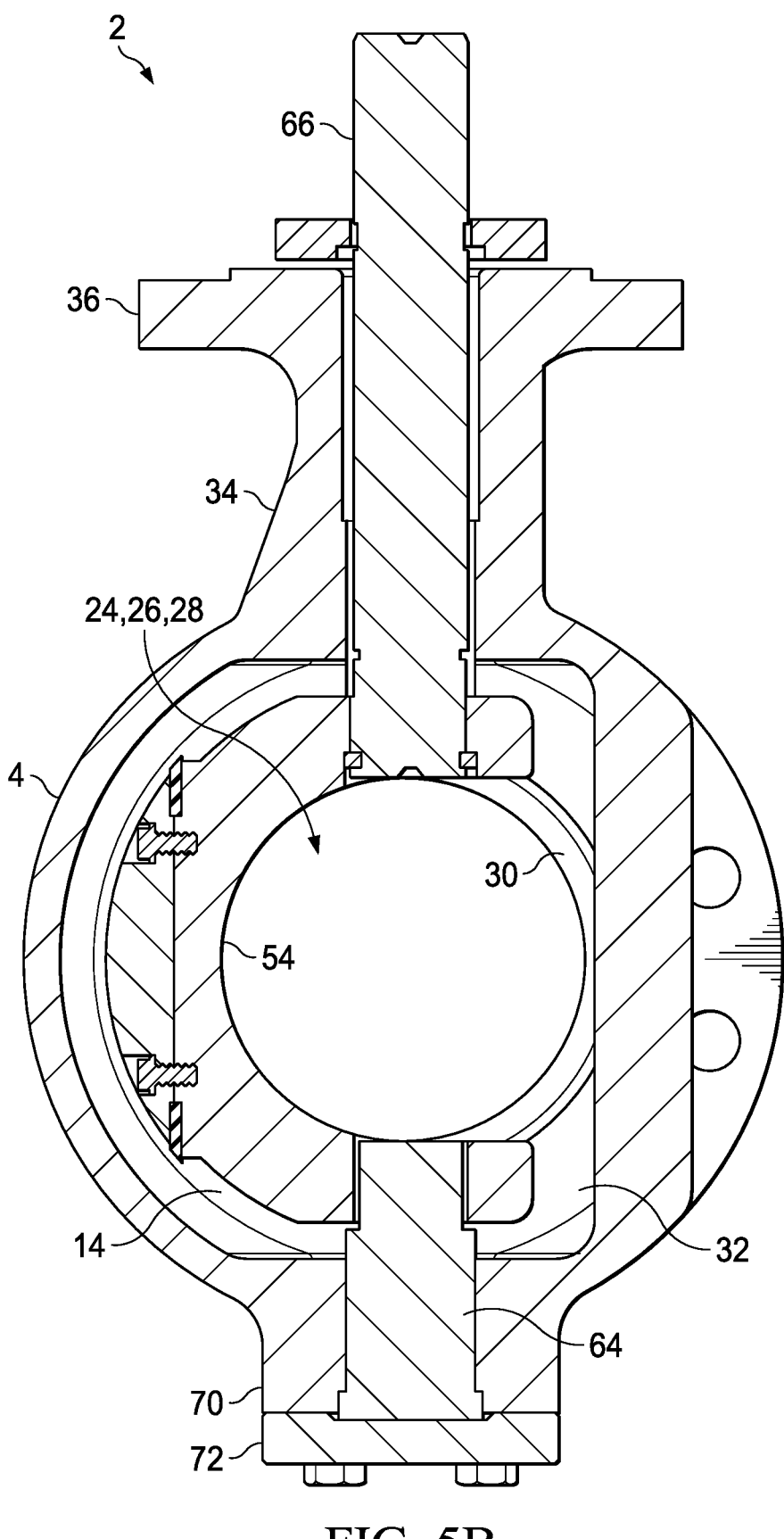
FIG. 5B illustrates another cross-sectional side view of a triple valve assembly showing an internal profile of a valve body and with a seat ring installed in accordance with various embodiments of this disclosure.
Figure 5C:
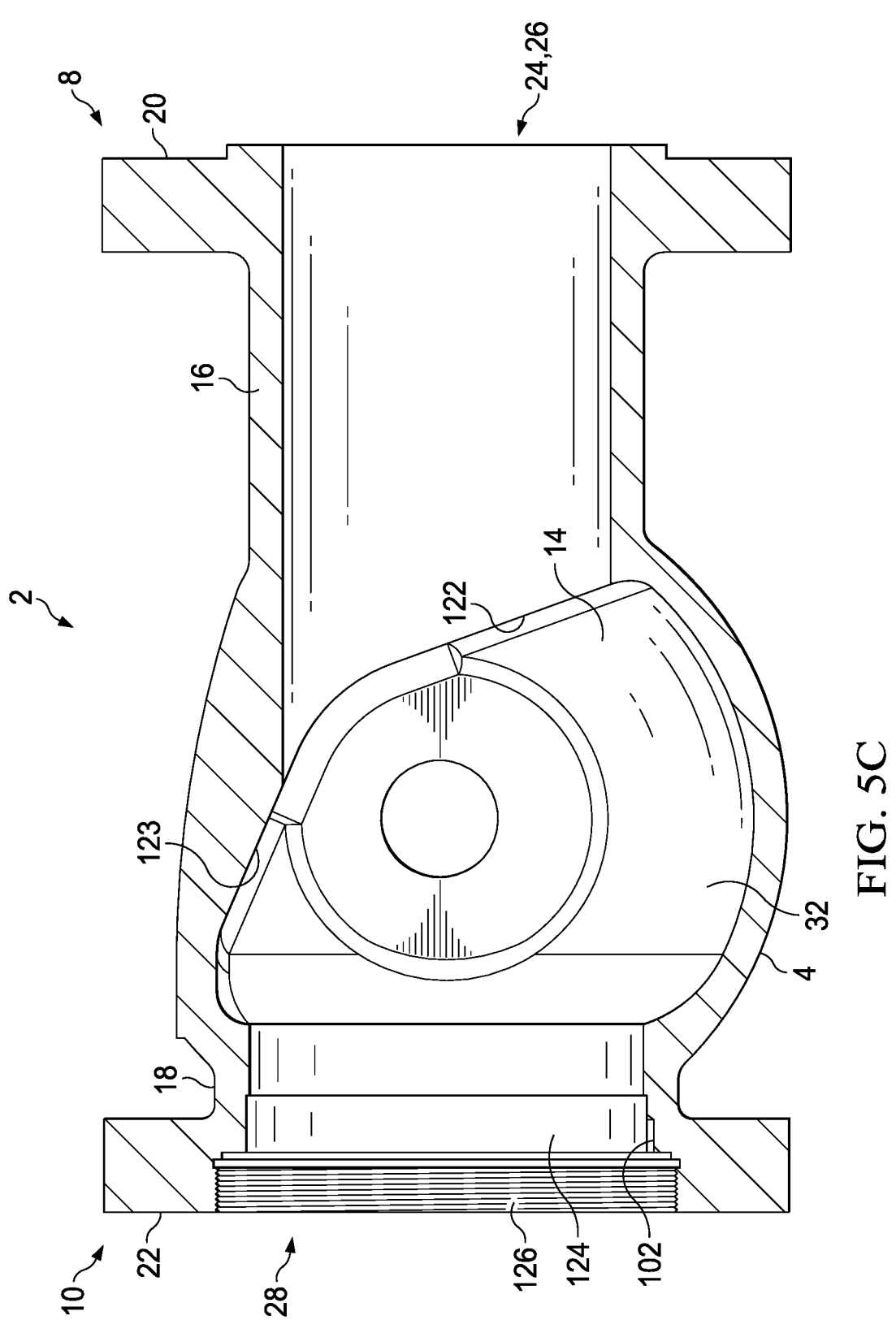
FIG. 5C illustrates a cross-sectional top view of a triple valve assembly showing an internal profile of a valve body in accordance with various embodiments of this disclosure.
Figure 5D:
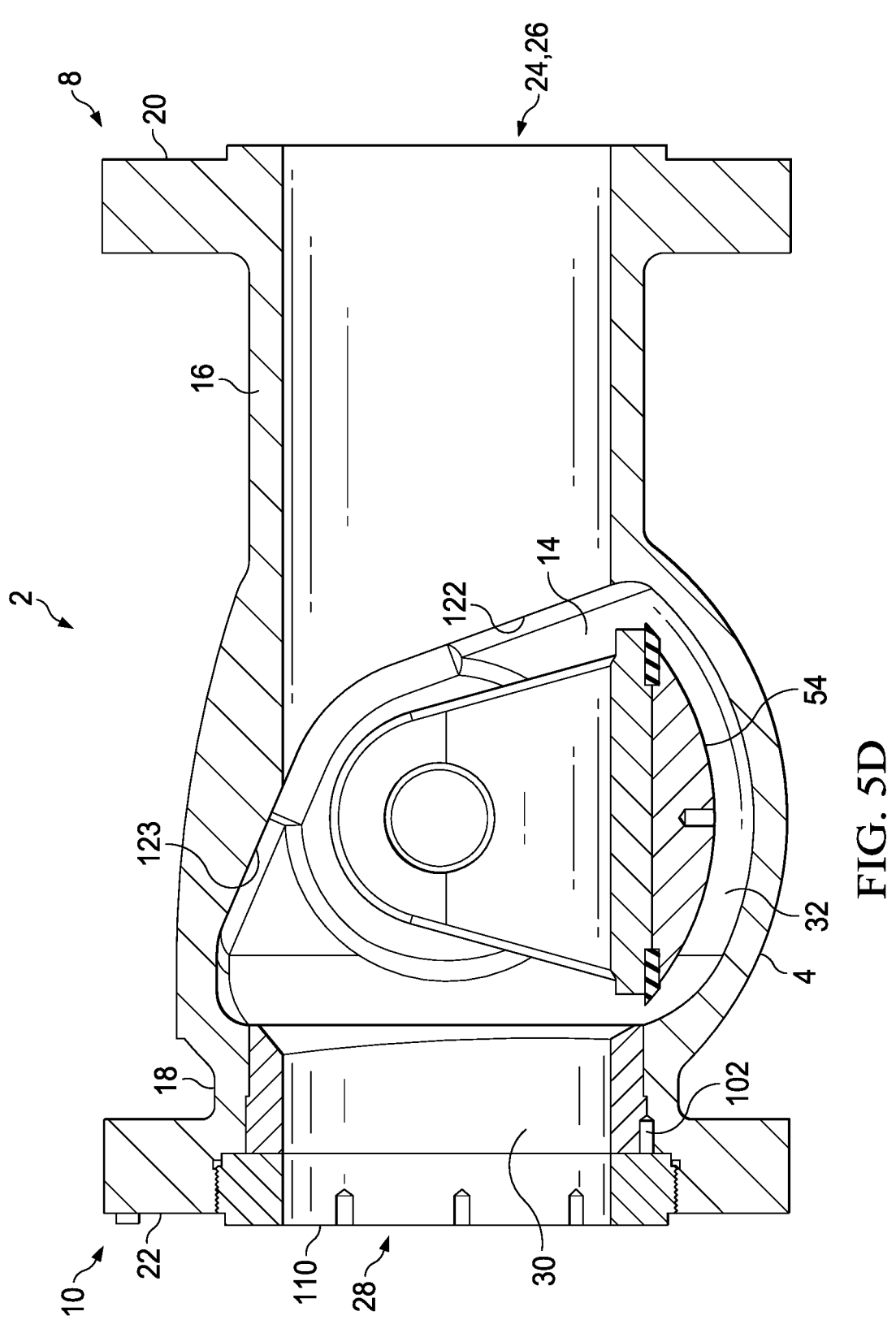
FIG. 5D illustrates another cross-sectional top view of a triple valve assembly showing an internal profile of a valve body and with a seat ring installed in accordance with various embodiments of this disclosure.

FIGS. 5A-5D illustrate various views of the triple valve assembly 2 showing the internal profile of the valve body 4 in accordance with various embodiments of this disclosure. FIG. 5A illustrates a cross-sectional side view of the triple valve assembly 2 showing the internal profile of the valve body 4 in accordance with various embodiments of this disclosure. FIG. 5B illustrates another cross-sectional side view of the triple valve assembly 2 showing the internal profile of the valve body 4 and with the seat ring 30 installed in accordance with various embodiments of this disclosure. FIG. 5C illustrates a cross-sectional top view of the triple valve assembly 2 showing the internal profile of the valve body 4 in accordance with various embodiments of this disclosure. FIG. 5D illustrates another cross-sectional top view of the triple valve assembly 2 showing the internal profile of the valve body 4 and with the seat ring 30 installed in accordance with various embodiments of this disclosure.

In various embodiments of this disclosure, the triple valve assembly 2 is cast as a unibody structure. The unibody structure of the triple valve assembly 2 provides an internal profile providing various benefits. For example, the valve body 4 includes the belly pocket or side portion 14 disposed in a portion of the interior chamber 32 of the valve body 4 outside of the flow paths 24, 26, 28, creating a streamlined flow path in which, when the disc 54 is in the open position, the disc 54 resides within the cavity 14 and is thus moved entirely out of the flow paths 24, 26, 28. In this way, the disc 54 does not obstruct the flow path 24, 26, 28 in the open position.

In particular, the disc 54 is rotatable within the interior chamber 32 between a closed position, wherein the disc 54 closes the second flow passageway 28, and an open position, wherein the flow passageways are completely unobstructed between the first and second ends 8, 10 of the valve body 4. The disc 54 and arms 56, 58 are disposed in the side portion 14 of the cavity when the valve is in the open position. This streamlined flow passage in which the disc 54 is entirely removed from the flow path when the disc 54 in the open position eliminates the choke area that other discs would create by remaining in the flow path. Additionally, using the two shafts 66, 64 avoids a shaft running through the interior chamber 32 and obstructing the flow. This provides a lower Delta P, i.e., there is less pressure drop than other valves because the disc 54 and other valve components such as a shaft are not within the flow path of the flow media. The unobstructed flow path provided by the internal profile also allows for the piggability of the triple valve assembly 2, allowing for a increased ease of maintenance and cleaning of the triple valve assembly 2 by a valve or pipe pig.

The internal provision of the valve body 4 also provides one or more anti-rotation features or edges 122. In some embodiments, one anti-rotation feature or edge 122 is defined by the meeting of the tubular portion 16 to the valve body 4 and the side portion 14, as shown in FIGS. 5C and 5D, and also in FIG. 4A. The disc 54 is operable to move between the open position in which the disc 54 resides within the side portion 14, and the closed position in which the disc 54 interfaces with the seat ring 30. The anti-rotation edge 122 prevents the disc 54 from over rotating such that the disc 54 does not obstruct the flow path when the disc 54 is in the open position. In some embodiments, another anti-rotation edge 123 prevents the disc 54 from over rotating when the disc 54 is rotated to the closed position, such that the disc 54 remains interfaced with the seat and does not allow for any flow media to pass therethrough.

Figures 6, 7:
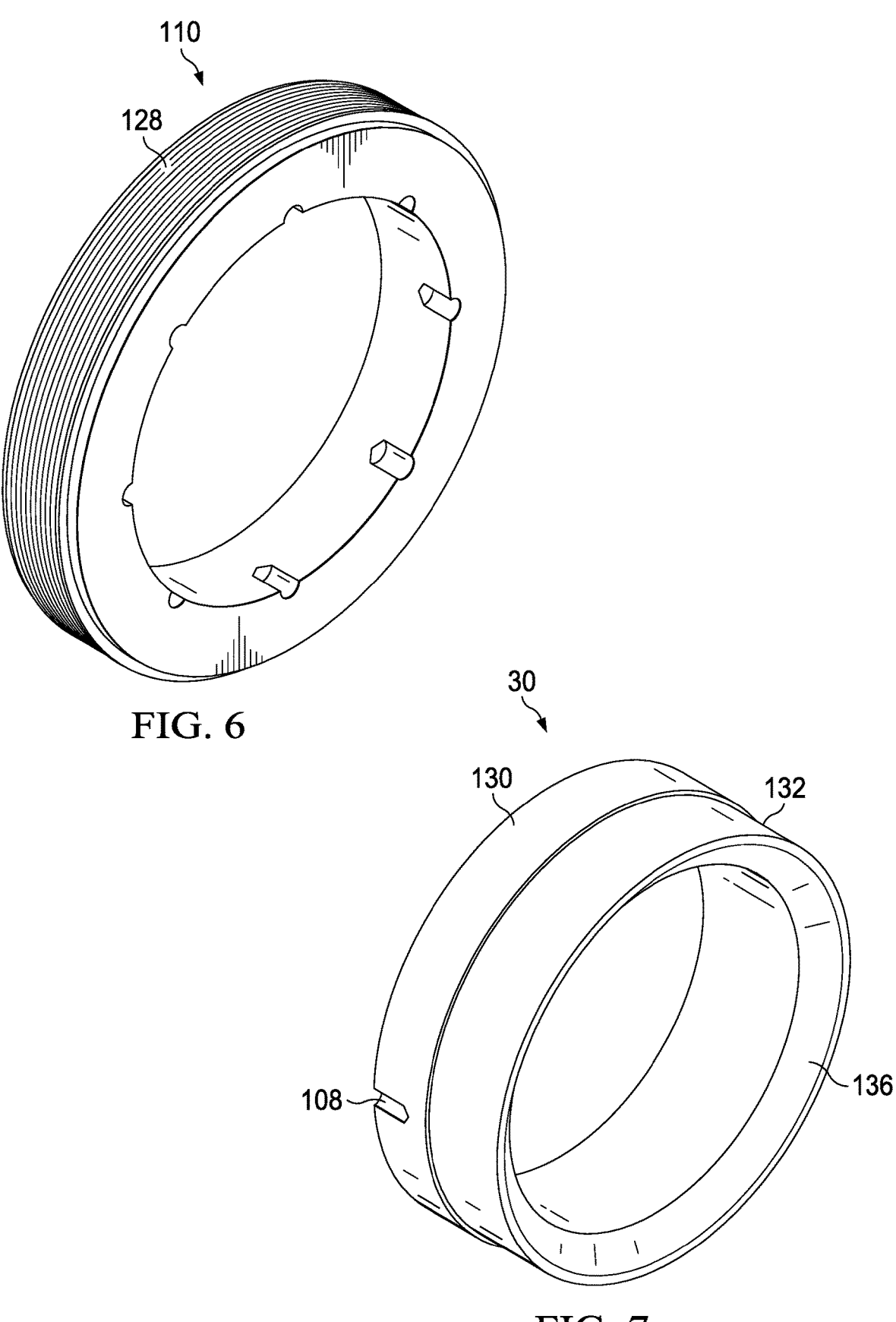
FIG. 6 illustrates a retainer ring in accordance with various embodiments of this disclosure.
FIG. 7 illustrates a perspective view of a seat ring in accordance with various embodiments of this disclosure.

As also illustrated in FIG. 5C, the internal profile of the unibody triple valve assembly 2 includes a seat alignment portion 124 and a threaded annulus 126. The seat alignment portion 124 includes a wider section adjacent the threaded annulus 126 and a narrower section adjacent the interior chamber 32 of the valve body 4. The wider section and narrower section of the seat alignment portion 124 matches the profile of the seat ring 30, such as shown in FIG. 7. The matching profiles of the seat alignment portion 124 and the seat ring 30, together with the locator 102, allows for the self-centering of the seat ring 30 into the seat alignment portion 124, reducing installation error during installation of the seat ring 30. Once the seat ring 30 is installed, the sealing component 112, which can be a laminated seal, is installed on the seat ring 30. In some embodiments, the seal 112 can be included with the seat ring 30 and installed contemporaneously with the seat ring 30 into the triple valve assembly 2. The threaded retainer ring 110, such as shown in FIG. 6, is threadedly engaged with the threaded annulus 126 to create a tight seal between the retainer ring 110 and the seat ring 30, with the seal 112 disposed between the retainer ring 110 and the seat ring 30.

FIG. 6 illustrates the retainer ring 110 in accordance with various embodiments of this disclosure. As described herein, once the seat ring 30 is installed, the sealing component 112, which can be a laminated seal, is installed on the seat ring 30. In some embodiments, the seal 112 can be included with the seat ring 30 and installed contemporaneously with the seat ring 30 into the triple valve assembly 2. As shown in FIG. 6, the threaded retainer ring 110 includes a threaded circumferential surface 128 that threadedly engages with the threaded annulus 126 of the flange 22 to create a tight seal between the retainer ring 110 and the seat ring 30, with the seal 112 disposed between the retainer ring 110 and the seat ring 30. Therefore, if any of the seat ring 30, the retainer ring 110, or the seal 112 needs to be maintained or replaced, the retainer ring 110 can be threadedly removed from the threaded annulus 126 to allow removal of the seat components.

Since the seat ring 30, the retainer ring 110, and the seal 112 can be accessed and removed in this manner, the triple valve assembly 2 need not be re-manufactured whenever these components 30, 110, and 112 are damaged or otherwise no longer fit for use.

Figures 8A, 8B:
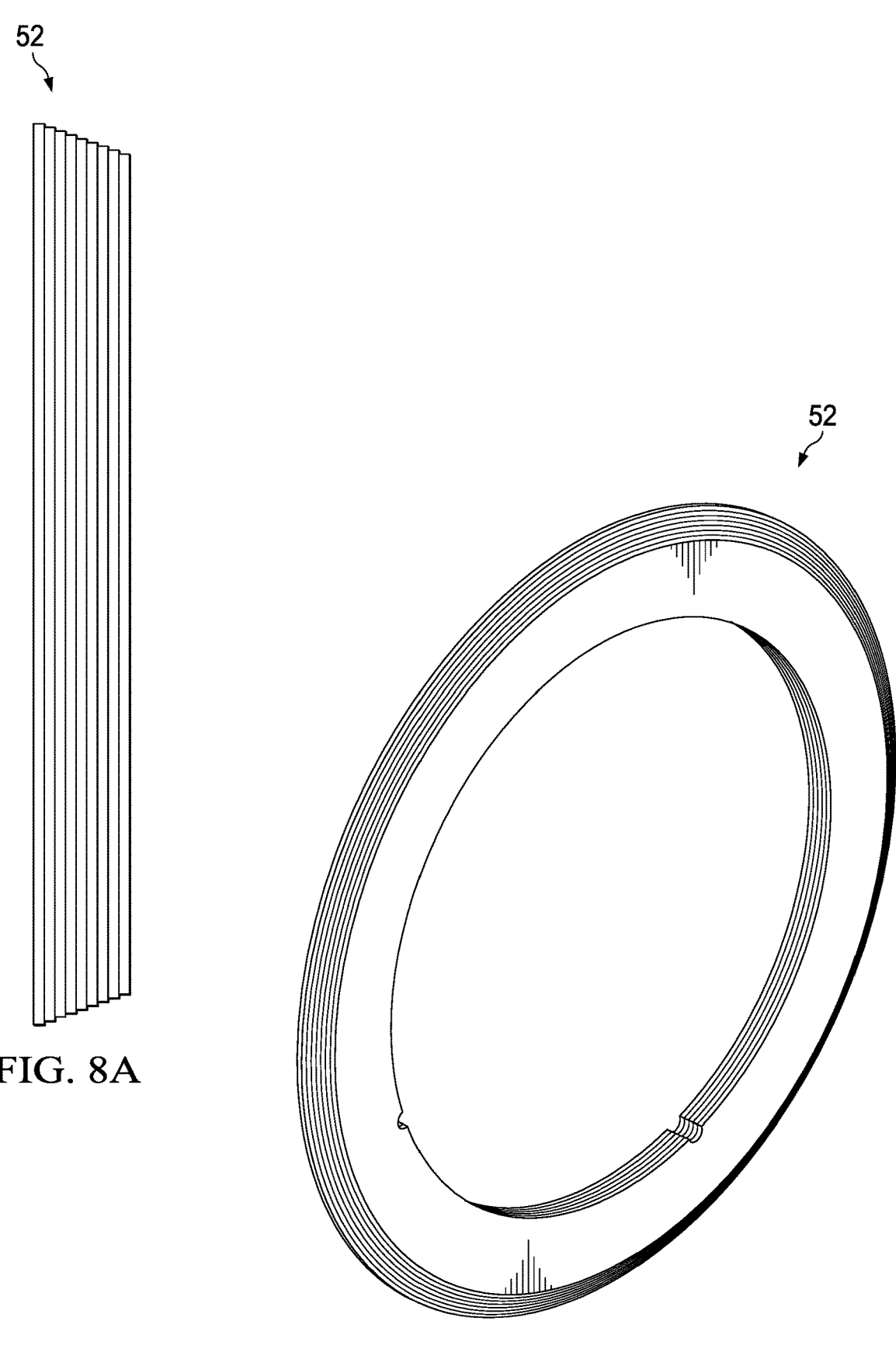
FIG. 8A illustrates a side view of an elliptical seal ring in accordance with various embodiments of this disclosure.
FIG. 8B illustrates a perspective view of an elliptical seal ring in accordance with various embodiments of this disclosure.

Referring now to FIGS. 7, 8A, and 8B, FIG. 7 illustrates a perspective view of the seat ring 30 in accordance with various embodiments of this disclosure, and FIGS. 8A and 8B illustrate a side view and a perspective view, respectively, of the elliptical seal ring 52 in accordance with various embodiments of this disclosure. The seat ring 30 includes a first section 130 and a second section 132, where, in some embodiments, the first section 130 is of a wider diameter than the second section 132. The respective profiles of the first section 130 and the second section 132 match the profile of the seat alignment portion 124 of the unibody valve as shown for example in FIG. 5C. It will be understood that the profiles of both the seat ring 30 and the seat alignment portion 124 could be altered, such that the profiles still match for placement of the seat ring 30 within the valve. The seat ring 30 also includes an indent, opening, or notch 108 that interfaces with the locator 102 described herein to assist with proper placement of the seat ring 30 in the valve.

With respect to the laminated seal ring 52 illustrated in FIGS. 8A and 8B, as described herein, the disc assembly 50 is configured as a laminate structure that includes the elliptical seal ring 52 that is coupled to the disc 54 by the seal retainer disc 60 and the plurality of fasteners 62. In this way, the seal ring 52 is removably coupled to the disc 54, such that it may be replaced if worn or damaged. For example, an operator may remove the fasteners 62 and the seal ring 52 and install a new seal ring, securing the seal ring with the seal retainer disc 60 and fasteners 62. The seal ring 52 engages a valve seat 136 created of seat ring 30 when the valve and disc 54 are in the closed position. It should be understood that, in some embodiments, the disc assembly, including the disc, arms, stems and sealing element, may be made as a single piece, or the disc, arms and sealing element may be made as a single piece, which is connected to the stems. The gaskets and sealing elements may be made of graphite and/or commercial grade stainless steel.

In various embodiments of this disclosure, the valve seat 136 is a concave surface, providing a unique elliptical third offset together with the shape of the seal ring 52. The seal ring 52 includes a convexly curved dome shape, or elliptical profile, mating with the concavely shaped valve seat 136, having a corresponding elliptical profile. The configuration of the disc assembly 50 is designed to allow frictionless opening and closing of the disc assembly to reduce the required torque needed to move or stroke the valve between open and closed positions. The seating creating by the valve seat 136 and the seal ring 52 provides for a unique elliptical third offset of the triple valve assembly 2.

Figure 9A:
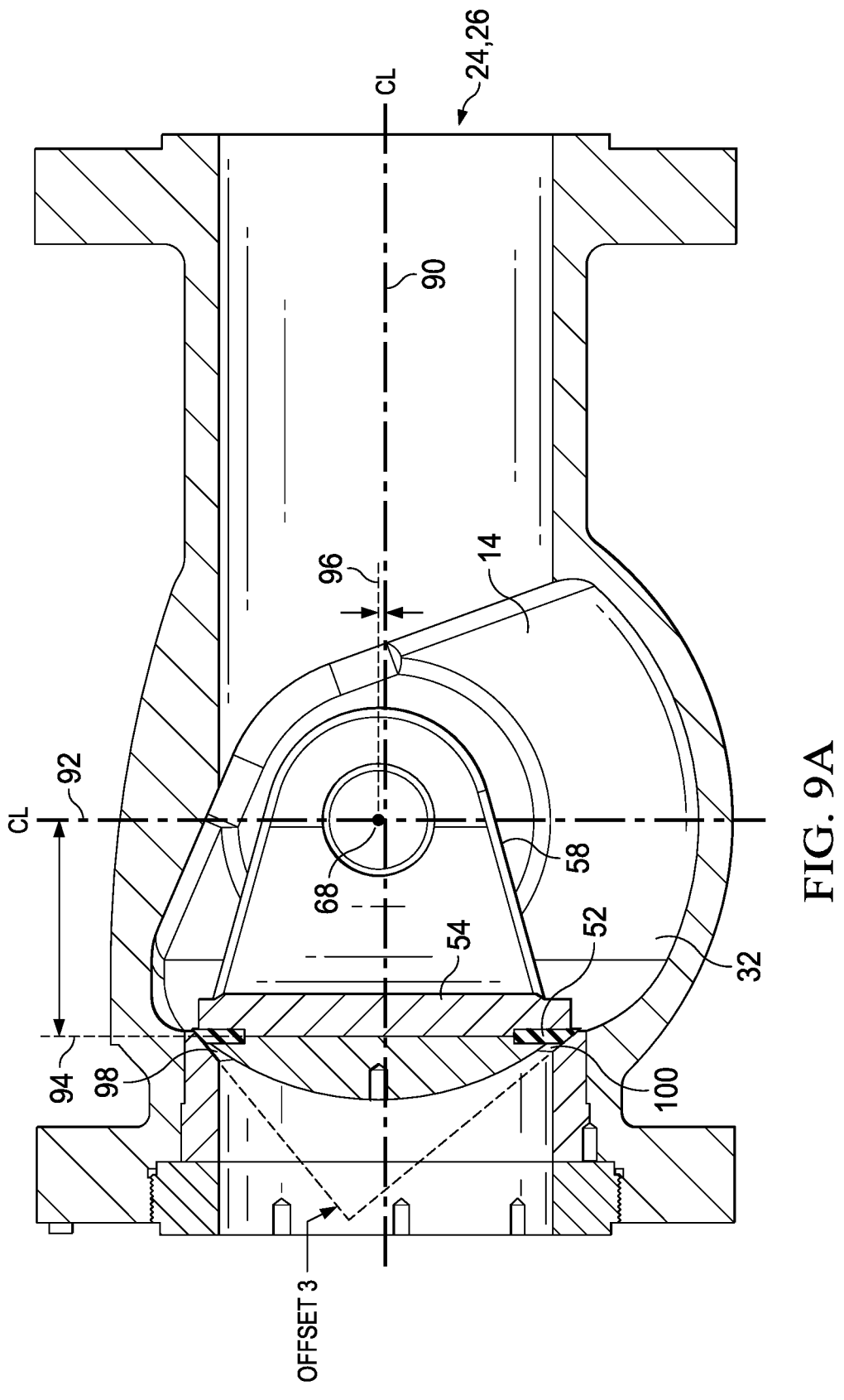
FIG. 9A illustrates a cross-sectional view of a triple valve assembly showing one example of a triple offset in accordance with various embodiments of this disclosure.
Figure 9B:
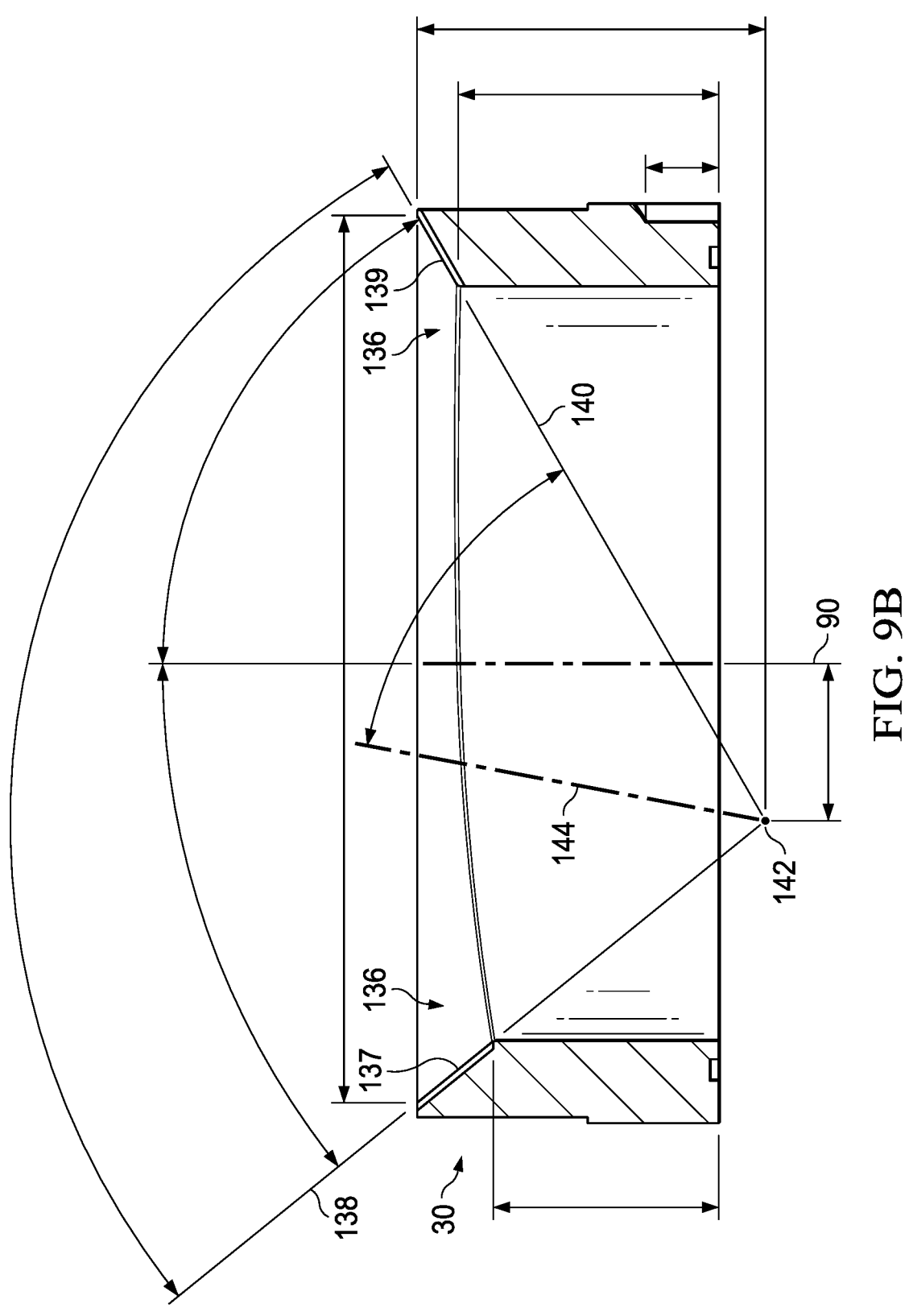
FIG. 9B illustrates an example elliptical third offset from the perspective of seat ring in accordance with various embodiments of this disclosure.
Figures 9C, 9D:
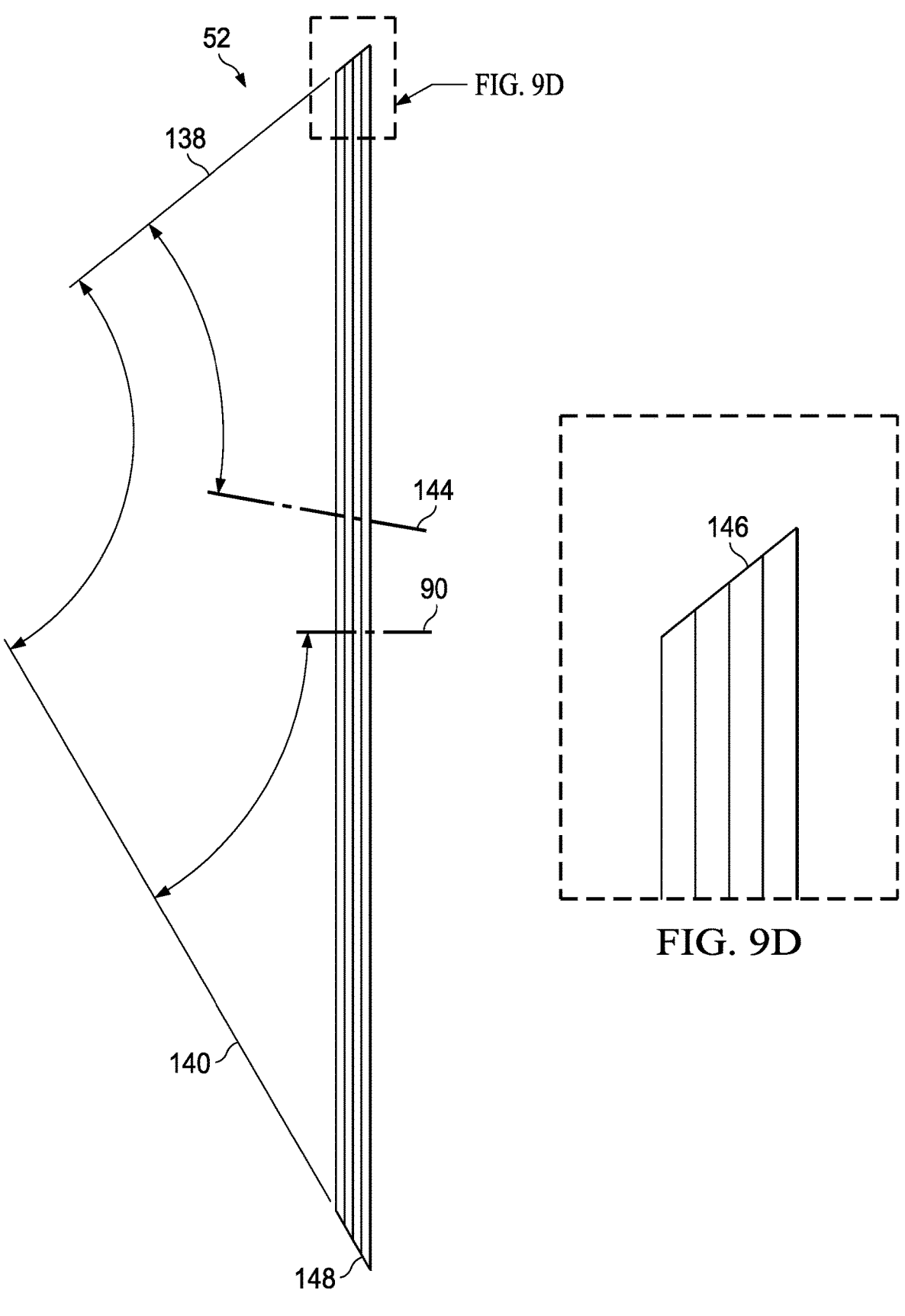
FIG. 9C illustrates an example elliptical third offset from the perspective of a seal ring in accordance with various embodiments of this disclosure.
FIG. 9D illustrates an enlarged view of a first portion of a seal ring in accordance with various embodiments of this disclosure.

FIGS. 9A-9D illustrate various views of the offsets of the triple valve assembly 2 in accordance with various embodiments of this disclosure. FIG. 9A illustrates a cross-sectional view of the triple valve assembly 2 showing one example of a triple offset in accordance with various embodiments of this disclosure. FIG. 9B illustrates an example elliptical third offset from the perspective of the seat ring 30 in accordance with various embodiments of this disclosure. FIG. 9C illustrates an example elliptical third offset from the perspective of the seal ring 52 in accordance with various embodiments of this disclosure. FIG. 9D illustrates an enlarged view of a first portion 146 of the seal ring 52 in accordance with various embodiments of this disclosure.

As shown in FIG. 9A, the position of the shafts 64, 66 relative to the seating surface of the valve is offset from the valve centerline in three axes to allow for frictionless seating and unseating of the valve as well as creating a leak tight sealing of the valve when in the closed position. The first offset and second offsets are relative to the vertical and horizontal centerline 90, 92 of the valve. These offsets aid with seating the valve when moving or stroking the valve closed by providing additional moment forces against the disc assembly when the valve is pressurized.

The third offset is an elliptical centerline of the seating and seal centerlines, which make frictionless opening and closing of the valve possible. In one embodiment, the disc 54 defines a central horizontal plane 94 offset from the rotation axis 68 relative to the stem/shaft centerline 92 (offset 1). The centerline axis 96 of the disc parallel to the centerline 90, and orthogonal to the plane 94, is offset from the rotation axis 68 (offset 2). The valve seat includes a first portion 98 that is non-parallel to a second portion 100 of the valve seat, or forms an angle (offset 3), allowing the valve to rotate and seal.

The first offset can thus be created by the axis 68 of the shaft being behind the centerline 94 of the sealing point of the disc 54 to the valve seat 136. The second offset can thus be created by the axis 68 of the shaft being eccentric to the center of the valve or pipe line. The third offset is defined by the geometry of the seat, creating an elliptical shape of the disc and seat. The triple offset design of the assembly 2 allows for the disc to seal against the seat without friction, and to provide a tight shutoff while using lower torque.

As illustrated in FIGS. 9B and 9C, the unique third offset of the various embodiments of this disclosure is created by the geometry of the valve seat 136 and the seal ring 52. As described herein, the valve seat 136 of the seat ring 30 can be a concave surface. As shown in FIG. 9B, the offset is at least partially defined by a first line 138 aligned with a first portion 137 of the concave valve seat 136 and a second line 140 aligned with a second portion 139 of the concave valve seat 136. As illustrated in FIG. 9B, the first portion 137 is non-parallel to the second portion 139. For example, the first portion 137 can include an increased or longer incline than that of the second portion 139. It will be understood that since the concave valve seat 136 is circular, there can be a gradual change around the circular surface to reach the differences in incline of the first and second portions 137, 139. Other valves typically include a flat spot or edge on the seat and/or disc, but the third offset included in the various embodiments of this disclosure provide a continuously changing angle that never reaches zero. The seat ring 30 is oriented such that the concave valve seat 136 faces an interior of the valve towards the location of the disc 54 within the valve. A vertex 142 of the first and second lines 138, 140 is disposed a distance from the centerline axis 90, defining angles and/or arcs of the elliptical offset between a seat cone axis 144 extending from the vertex 142 towards the centerline 90 and each of the first and second lines 138, 140. For instance, in the example of FIG. 9B, an angle between the seat cone axis 144 and the second line 140 is 49.5 degrees.

As shown in FIG. 9B, additional angles of the elliptical third offset are defined by the centerline 90 and the first and second lines 138, 140. An overall angle defined by the first and second lines 138, 140 is shown for example as being 99°±0.25°. Sub-angles are defined by each of the first and second lines 138, 140 and the centerline 90. As shown in FIG. 9B, for example, and angle between the first line 138 and the centerline 90 is 39° and an angle between the second line 140 and the centerline 90 is 60°±0.12°. Thus, the angle between the centerline 90 and the first line 138 created by the first portion 137 is smaller than the angle between the centerline 90 and the second line 140 created by the second portion 139. It will be understood that some variations in the angles, distances, and other measurements shown in FIG. 9B can be allowed without deviating from the scope of this disclosure.

As shown in FIGS. 9C and 9D, the seal ring 52 installed on the disc 54 by the seal retainer disc 60 includes a first portion 146 that meets with the first portion 137 of the valve seat 136 of the seat ring 30 and a second portion 148 that meets with the second portion 139 of the valve seat 136 when the disc 54 rotates to the closed position. The first portion 146 is non-parallel to the second portion 148. For example, the first portion 146 can include a decreased or shorter incline than that of the second portion 148. It will be understood that since the seal ring 52 is circular, there can be a gradual change around the circular surface to reach the differences in incline of the first and second portions 146, 148. Other valves typically include a flat spot or edge on the seat and/or disc, but the third offset included in the various embodiments of this disclosure provide a continuously changing angle that never reaches zero. The first and second lines 138, 140 also correspond to the first portion 146 and the second portion 148, respectively, as shown in FIG. 9C. The seat cone axis 144 is illustrated in FIG. 9C as continuing to run through the seal ring 52, providing a similar angle of 49.5° as illustrated in FIG. 9B. As also shown in FIG. 9C, a complementary overall angle of 99° is shown as corresponding to the overall angle illustrated in FIG. 9B. Additionally, FIG. 9C illustrates sub-angles defined by the first and second lines 138 and 140 and the centerline 90, such as an angle between second line 140 and centerline 90 of 60°, that complement the angles illustrated in FIG. 9B. It will be understood that some variations in the angles, distances, and other measurements shown in FIG. 9C can be allowed without deviating from the scope of this disclosure.

The unique third offset created by the geometry of the loose valve seat 136 and the laminated seal ring 52 provide for improved frictionless sealing, allowing for repeatable sealing with an extended valve life, while also providing tight shut off of the valve using lower torque.

Figure 10B:
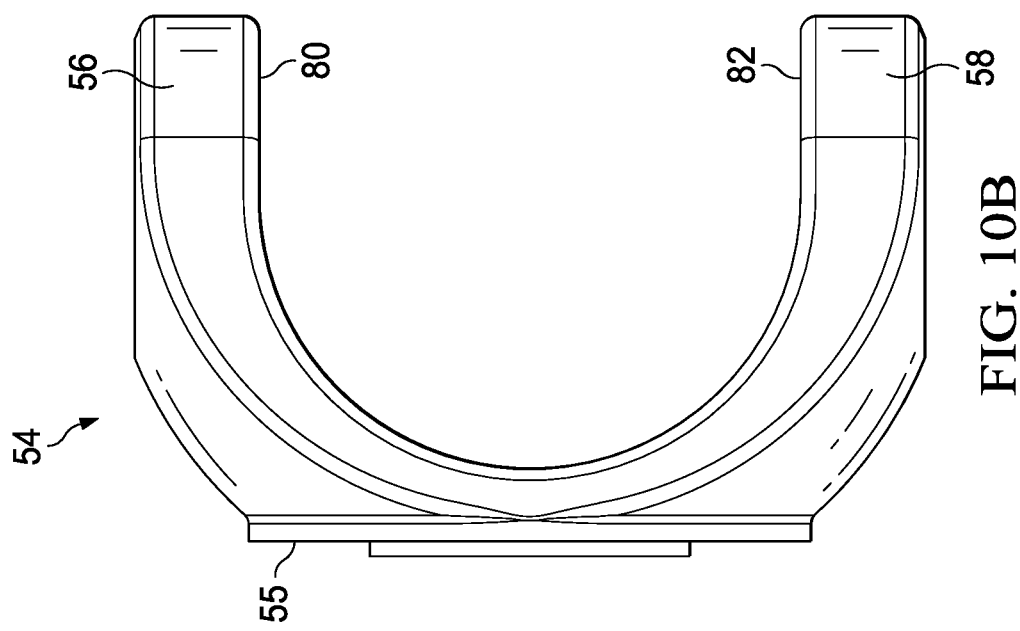
FIG. 10B illustrates a side view of a valve disc in accordance with various embodiments of this disclosure.
Figure 10A:
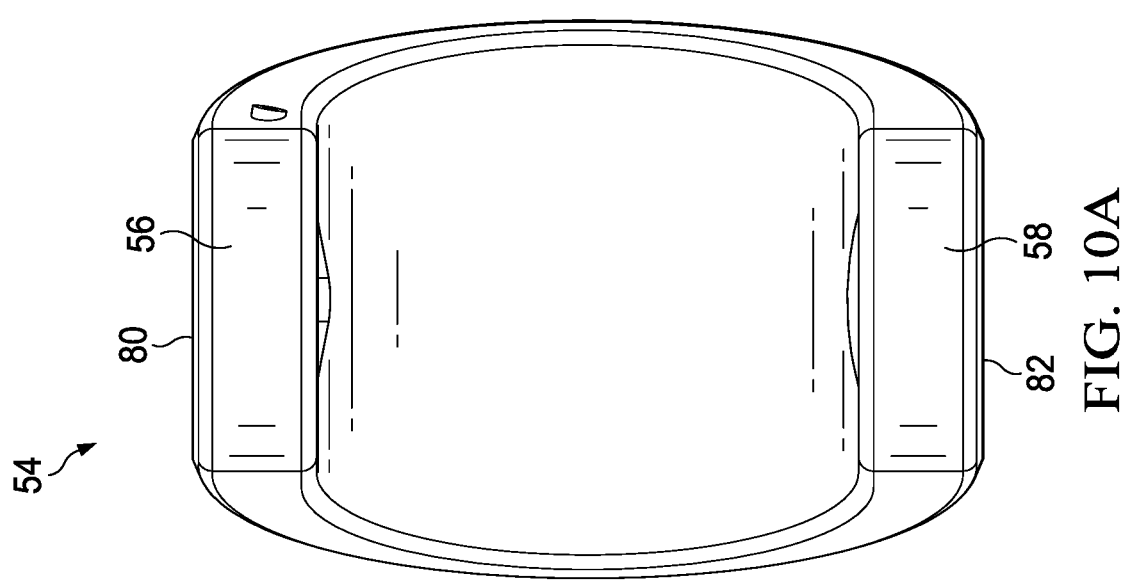
FIG. 10A illustrates an end view of a valve disc in accordance with various embodiments of this disclosure.
Figure 10C:
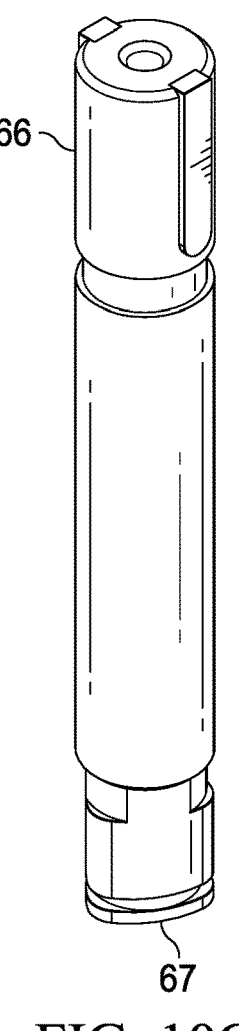
FIG. 10C illustrates a perspective view of a shaft in accordance with various embodiments of this disclosure.
Figure 10D:
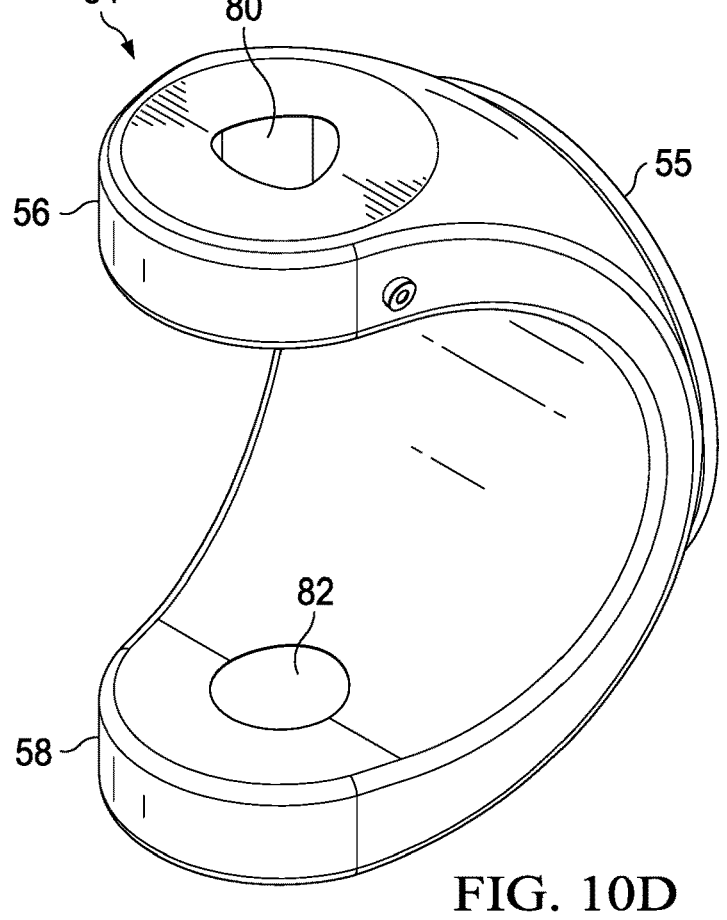
FIG. 10D illustrates a perspective view of a valve disc in accordance with various embodiments of this disclosure.
Figure 10E:
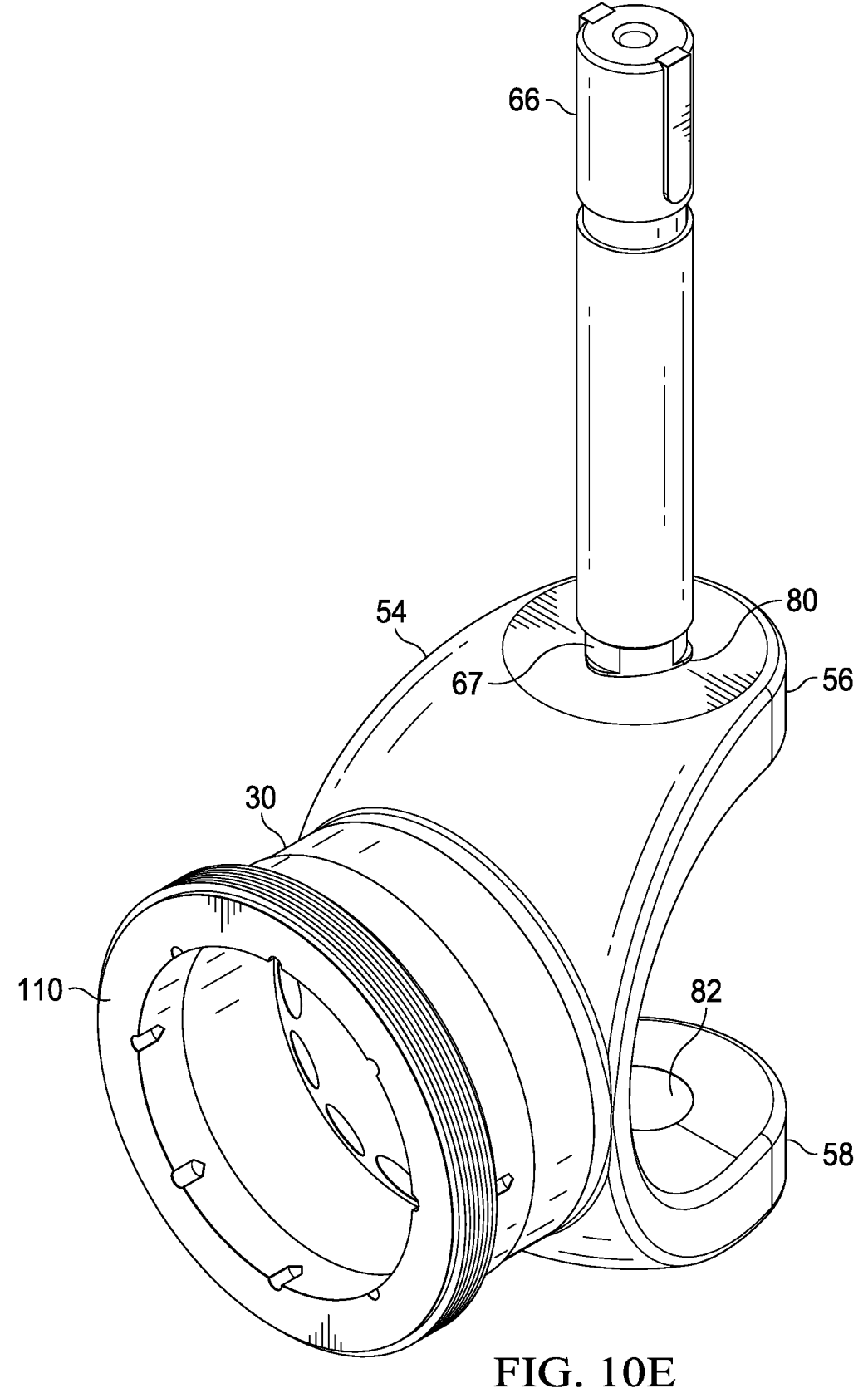
FIG. 10E illustrates a perspective view of a valve disc installed on a shaft in accordance with various embodiments of this disclosure.

FIGS. 10A-10E illustrate various views of the valve disc 54 and the shaft 66 in accordance with various embodiments of this disclosure. FIG. 10A illustrates an end view of the valve disc 54 in accordance with various embodiments of this disclosure. FIG. 10B illustrates a side view of the valve disc 54 in accordance with various embodiments of this disclosure. FIG. 10C illustrates a perspective view of the shaft 66 in accordance with various embodiments of this disclosure. FIG. 10D illustrates a perspective view of the valve disc 54 in accordance with various embodiments of this disclosure. FIG. 10E illustrates a perspective view of the valve disc 54 installed on the shaft 66 in accordance with various embodiments of this disclosure.

The disc 54 includes the first and second arms 56, 58, which are situated tangentially to the disc 54, thereby ensuring that the positions of the arms 56, 58 are outside the flow path of the media, or flow passageways 26, 28 projected along the longitudinal axis 12. The first and second arms 56, 58 extend from the top and bottom of the disc 54 respectively, with each of the first and second arms having a hub 80, 82 for non-rotatably coupling the disc 54 to the first and second stem portions 66, 64 respectively. The disc arms 56, 58 are mounted on the stems/shafts 66, 64, with the stem/shafts 66, 64 being rotated by an operator or actuator, which rotates the disc assembly between the closed position and the open position.

As illustrated in FIGS. 10C-10E, in various embodiments of this disclosure, one or more of the hubs 80, 82 of the disc 54 can include openings or apertures in a polygonal shape to provide a poka yoke connection between the disc 54 and one or more of the shafts 66, 64. For example, as illustrated in FIGS. 10C and 10D, the shaft 66 can include a polygonal end 67 that matches the polygonal shape of the hub 80 of the disc 54. The matching polygonal shapes of the polygonal hub 80 and the polygonal end 67 of the shaft 66 provides a unique polygonal connection between the shaft 66 and the hub 80 such that the shaft 66 is received into the hub 80 in a predetermined orientation. In some embodiments, the polygonal shape used is a non-symmetrical or irregular shape such that the shaft 66 can only be received into the hub

80 in one particular rotational position of the shaft 66. It will be understood that, although FIGS. 10C-10E illustrate one example polygonal shape, various polygonal shapes can be used, including regular or irregular polygonal shapes, convex or concave polygonal shapes, and/or simple or complex polygonal shapes. It will be understood that the shaft 64 and the hub 82 can also be polygonal in a similar manner to provide for a poka yoke connection between the shaft 64 and the disc 54. The polygonal connection between the one or more of the shafts 66, 64 and one or more of the hubs 80, 82 also provide for 100% torque transmission between from the shafts 66, 64 to the disc 54.

The full bore profile and lug design of the disc 54 assists with achieving smooth flow and strength in media transport using the assembly 2. Additionally, the disc 54 includes a seal guide 55 that matches the profile of the seal ring 52, providing a poka yoke installation of the seal ring 52 on the disc 54 to ensure sufficient sealing between the disc 54 and the valve seat 136 of the seat ring 30.

As shown in FIG. 10E, the disc 54 moves to seal the flow path by interfacing with the seat ring 30. As described in the various embodiments herein, the disc 54 does not obstruct the flow path 24, 26, 28 when in the open position. In particular, the disc 54 is rotatable within the interior chamber 32 between the closed position, wherein the disc closes the second flow passageway 28, and the open position, wherein at least one of the first and second flow passageways, or both, are completely unobstructed between the first and second end portions 8, 10 of the valve body. In addition, in various embodiments, since the shafts 64, 66 are separate shafts, the shafts also do not obstruct the flow paths 24, 26, 28.

In one example embodiment, a valve comprises a valve body comprising first and second ends spaced apart along a longitudinal axis and a central portion disposed between the first and second ends, wherein the first and second ends define first and second flow passageways respectively, and wherein the central portion defines an interior chamber, a stem rotatably supported by the valve body about a rotation axis, and a disc coupled to the stem, wherein the disc is rotatable within the interior chamber between a closed position, wherein the disc closes one of the first or second flow passageways, and an open position, wherein at least one of the first and second flow passageways is completely unobstructed between the first and second ends of the valve body when projected along the longitudinal axis.

In one or more of the above examples, the disc defines a central plane offset from the rotation axis.

In one or more of the above examples, a centerline axis of the disc orthogonal to the central plane is offset from the rotation axis.

In one or more of the above examples, the valve body defines a valve seat engaged by the disc when the disc is in the closed position, wherein a first portion of the valve seat are non-parallel to a second portion of the valve seat.

In one or more of the above examples, the stem comprises a first stem portion supported by the valve body and coupled to a top of the disc, and a second stem portion supported by the valve body and coupled to the bottom of the disc, wherein the first and second stem portions are spaced apart on opposite sides of, and do not project into, the at least one of the first and second flow passageways projected along the longitudinal axis.

In one or more of the above examples, the valve further comprises first and second arms extending from the top and bottom of the disc respectively, each of the first and second arms comprising a hub coupled to one of the first and second stem portions.

In one or more of the above examples, both of the first and second flow passageways are completely unobstructed between the first and second ends of the valve body when each of the first and second flow passageways is projected along the longitudinal axis.

In one or more of the above examples, the first and second flow passageways are coaxial.

In one or more of the above examples, the first and second flow passageways have respective first and second cross-sectional areas defined orthogonal to the longitudinal axis, wherein the first cross-sectional area is the same as the second cross-sectional area.

In one or more of the above examples, the valve body defines a valve seat, and wherein further comprising a seal ring removably coupled to the disc, wherein the seal ring engages the valve seat when the disc is in the closed position.

In one or more of the above examples, the interior chamber comprises an enlarged side portion positioned outside of the at least one of the first and second flow passageways projected along the longitudinal axis, wherein the disc is disposed in the side portion when the valve is in the open position.

In another example embodiment, a valve comprises a valve body comprising first and second ends spaced apart along a longitudinal axis and a central portion disposed between the first and second ends, wherein the first and second ends define first and second flow passageways respectively, and wherein the central portion defines an interior chamber, a stem comprising a first stem portion supported by a top of the valve body and a second stem portion supported by a bottom of the valve body, wherein the first and second stem portions are spaced apart on opposite sides of, and do not project into, at least one of the first and second flow passageways when projected along the longi-tudinal axis, wherein the first and second stem portions are co-axial and define a rotation axis, and a valve comprises a disc having a top coupled to the first stem portion and a bottom coupled to the second stem portion, wherein the valve is rotatable within the interior chamber between a closed position, wherein the disc closes one of the first or second flow passageways, and an open position, wherein at least one of the first and second flow passageways is completely unobstructed by the valve between the first and second ends of the valve body when projected along the longitudinal axis.

In one or more of the above examples, the disc defines a central plane offset from the rotation axis.

In one or more of the above examples, a centerline axis of the disc orthogonal to the central plane is offset from the rotation axis.

In one or more of the above examples, the valve body defines a valve seat engaged by the disc when the disc is in the closed position, wherein a first portion of the valve seat are non-parallel to a second portion of the valve seat.

In one or more of the above examples, the valve further comprises first and second arms extending from the top and bottom of the disc respectively, each of the first and second arms comprising a hub coupled to one of the first and second stem portions.

In one or more of the above examples, both of the first and second flow passageways are completely unobstructed between the first and second ends of the valve body when each of the first and second flow passageways is projected along the longitudinal axis.

In one or more of the above examples, the first and second flow passageways are coaxial.

In one or more of the above examples, the first and second flow passageways have respective first and second cross-sectional areas defined orthogonal to the longitudinal axis, wherein the first cross-sectional area is the same as the second cross-sectional area.

In one or more of the above examples, the valve body defines a valve seat, and wherein the valve comprises a seal ring removably coupled to the disc, wherein the seal ring engage the valve seat when the valve is in the closed position.

In one or more of the above examples, the interior chamber comprises an enlarged side portion positioned outside of the at least one of the first and second flow passageways projected along the longitudinal axis, wherein the disc is disposed in the side portion when the valve is in the open position.

In another example embodiment, a method of operating a valve comprises rotating a valve comprising a disc in a valve body about a rotation axis between an open position and a closed position, wherein the valve body comprises first and second ends spaced apart along a longitudinal axis and a central portion disposed between the first and second ends, wherein the first and second ends define first and second flow passageways respectively, and wherein the central portion defines an interior chamber, wherein the disc closes one of the first or second flow passageways in the closed position, and wherein at least one of the first and second flow passageways is completely unobstructed between the first and second ends of the valve body when projected along the longitudinal axis when the valve is in the open position.

In one or more of the above examples, rotating the valve comprises rotating a stem about the rotation axis, wherein the disc is coupled to the stem, and rotating the disc within the interior chamber.

In one or more of the above examples, the disc defines a central plane offset from the rotation axis.

In one or more of the above examples, a centerline axis of the disc orthogonal to the central plane is offset from the rotation axis.

In one or more of the above examples, the valve body defines a valve seat engaged by the disc when the disc is in the closed position, wherein a first portion of the valve seat are non-parallel to a second portion of the valve seat.

In one or more of the above examples, the stem comprises a first stem portion supported by the valve body and coupled to a top of the disc, and a second stem portion supported by the valve body and coupled to the bottom of the disc, wherein the first and second stem portions are spaced apart on opposite sides of, and do not project into, the at least one of the first and second flow passageways projected along the longitudinal axis.

In one or more of the above examples, the valve further comprises first and second arms extending from the top and bottom of the disc respectively, each of the first and second arms comprising a hub coupled to one of the first and second stem portions.

In one or more of the above examples, both of the first and second flow passageways are completely unobstructed between the first and second ends of the valve body when each of the first and second flow passageways is projected along the longitudinal axis when the valve is in the open position.

In one or more of the above examples, the first and second flow passageways are coaxial.

In one or more of the above examples, the first and second flow passageways have respective first and second cross-sectional areas defined orthogonal to the longitudinal axis, wherein the first cross-sectional area is the same as the second cross-sectional area.

In one or more of the above examples, the valve body defines a valve seat, and wherein the valve comprises a first seal ring coupled to the disc, wherein the first seal ring engage the valve seat when the valve is in the closed position, and further comprising removing the first seal ring and installing a second seal ring on the disc.

In one or more of the above examples, the interior chamber comprises an enlarged side portion positioned outside of the at least one of the first and second flow passageways projected along the longitudinal axis, wherein the disc is disposed in the side portion when the valve is in the open position.

In one or more of the above examples, the disc comprises an elliptical seal.

In one or more of the above examples, the first end of the body comprises a bore, and further comprising a seat ring disposed in the bore and defining at least in part the first flow passageway.

In one or more of the above examples, the seat ring comprises a concave sealing surface, and wherein disc engages the sealing surface when rotated to the closed position.

In one or more of the above examples, the valve further comprises a retainer ring securing the seat ring to the body.

In one or more of the above examples, the valve comprises a sealing component disposed between the seat ring and the retainer ring.

In one or more of the above examples, the valve further comprises a locator interfacing between the seat ring and the body.

In one or more of the above examples, the locator comprises a pin disposed in an opening defined in part by the valve body and in part by an outer surface of the seat ring.

In another example embodiment, a valve comprises a valve body comprising first and second ends spaced apart along a longitudinal axis and a central portion disposed between the first and second ends, wherein the first end comprises a bore, a valve moveably disposed in the central portion, wherein the valve is moveable between open and closed positions, a seat ring disposed in the bore and defining at least in part a flow passageway, and a locator interfacing between the seat ring and the body, wherein the locator positionally locates the seat ring relative to the body.

In one or more of the above examples, the locator comprises a pin disposed in an opening defined in part by the valve body and in part by an outer surface of the seat ring.

In one or more of the above examples, the seat ring comprises a concave sealing surface, and wherein the valve comprises a disc engaging the sealing surface when moved to a closed position.

In one or more of the above examples, comprising a retainer ring securing the seat ring to the body.

In one or more of the above examples, the valve comprises a sealing component disposed between the seat ring and the retainer ring.

In another example embodiment, a unibody valve comprises a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber, and a disc disposed within the interior chamber, wherein the interior chamber includes an enlarged side portion positioned outside of the at least one of the first flow passageway and the second flow passageway projected along the longitudinal axis, wherein the disc is disposed in the enlarged side portion when in an open position.

In one or more of the above examples, the unibody valve further comprises an anti-rotation edge disposed on at least one side of the enlarged side portion, wherein the anti-rotation edge prevents the disc from rotating beyond the anti-rotation edge.

In one or more of the above examples, the anti-rotation edge is defined by a meeting of one of the first flow passageway and the second flow passageway with the interior chamber and the enlarged side portion.

In one or more of the above examples, the unibody valve further comprises another anti-rotation edge disposed on an opposite side of the longitudinal axis from the enlarged side portion.

In one or more of the above examples, the unibody valve further comprises a stem rotatably supported by the valve body about a rotation axis, wherein the disc is coupled to the stem and is rotatable within the interior chamber between a closed position, wherein the disc closes one of the first flow passageway or the second flow passageway, and the open position, wherein at least one of the first flow passageway and the second flow passageway is completely unobstructed between the first end and the second end of the valve body when projected along the longitudinal axis.

In one or more of the above examples, the disc defines a central plane offset from the rotation axis.

In one or more of the above examples, a centerline axis of the disc orthogonal to the central plane is offset from the rotation axis.

In one or more of the above examples, the valve body defines a valve seat engaged by the disc when the disc is in the closed position, wherein a first portion of the valve seat is non-parallel to a second portion of the valve seat.

In one or more of the above examples, the stem includes a first stem portion supported by the valve body and coupled to a top of the disc, and a second stem portion supported by the valve body and coupled to a bottom of the disc, wherein the first and second stem portions are spaced apart on opposite sides of, and do not project into, the at least one of the first flow passageway and the second flow passageway projected along the longitudinal axis.

In one or more of the above examples, the disc includes first and second arms extending from the top and the bottom of the disc respectively, each of the first and second arms including a hub coupled to one of the first and second stem portions.

In one or more of the above examples, both of the first flow passageway and the second flow passageway are completely unobstructed between the first end and the second end of the valve body when each of the first flow passageway and the second flow passageway is projected along the longitudinal axis.

In one or more of the above examples, the first flow passageway and the second flow passageway are coaxial.

In one or more of the above examples, the first flow passageway and the second flow passageway have respective first and second cross-sectional areas defined orthogonal to the longitudinal axis, wherein the first cross-sectional area is the same as the second cross-sectional area.

In one or more of the above examples, the valve body is piggable when the disc is in the open position.

In one or more of the above examples, the first end of the valve body includes a bore, and further comprising a seat ring disposed in the bore and defining at least in part the first flow passageway.

In one or more of the above examples, the seat ring includes a concave sealing surface, and wherein the disc engages the concave sealing surface when rotated to a closed position.

In one or more of the above examples, the unibody valve further comprises a retainer ring securing the seat ring to the valve body.

In one or more of the above examples, the unibody valve further comprises a sealing component disposed between the seat ring and the retainer ring.

In one or more of the above examples, the unibody valve further comprises a locator interfacing between the seat ring and the valve body.

In one or more of the above examples, the locator includes a pin disposed in an opening defined in part by the valve body and in part by an outer surface of the seat ring.

In another example embodiment, a valve comprises a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber, a stem rotatably supported by the valve body about a rotation axis, wherein the stem includes a polygonal end, and a disc disposed within the interior chamber and including a polygonal aperture to receive the polygonal end of the stem.

In one or more of the above examples, the polygonal aperture of the disc and the polygonal end of the stem include matching polygonal shapes to assist with installation of the stem to the disc and to provide increased torque transmission from the stem to the disc.

In one or more of the above examples, the disc is rotatable within the interior chamber between a closed position, wherein the disc closes one of the first flow passageway or the second flow passageway, and an open position, wherein at least one of the first flow passageway and the second flow passageway is completely unobstructed between the first end and the second end of the valve body when projected along the longitudinal axis.

In one or more of the above examples, the stem includes a first stem portion supported by the valve body and coupled to a top of the disc, and a second stem portion supported by the valve body and coupled to a bottom of the disc, wherein the first and second stem portions are spaced apart on opposite sides of, and do not project into, the at least one of the first flow passageway and the second flow passageway projected along the longitudinal axis.

In one or more of the above examples, the disc includes first and second arms extending from the top and the bottom of the disc respectively, each of the first and second arms including a hub coupled to one of the first and second stem portions.

In one or more of the above examples, one of the first and second stem portions include the polygonal end.

In one or more of the above examples, the hub of one of the first and second arms includes the polygonal aperture.

In one or more of the above examples, the first and second stem portions include a first and second polygonal end, respectively, and the hub of each of the first and second arms includes a first and second polygonal aperture, respectively.

In one or more of the above examples, the disc defines a central plane offset from the rotation axis.

In one or more of the above examples, a centerline axis of the disc orthogonal to the central plane is offset from the rotation axis.

In one or more of the above examples, the valve body defines a valve seat engaged by the disc when the disc is in a closed position, wherein a first portion of the valve seat is non-parallel to a second portion of the valve seat.

In one or more of the above examples, the first flow passageway and the second flow passageway are coaxial.

In one or more of the above examples, the first flow passageway and the second flow passageway have respective first and second cross-sectional areas defined orthogonal to the longitudinal axis, wherein the first cross-sectional area is the same as the second cross-sectional area.

In one or more of the above examples, the first end of the valve body includes a bore, and further comprising a seat ring disposed in the bore and defining at least in part the first flow passageway.

In one or more of the above examples, the seat ring includes a concave sealing surface, and wherein the disc engages the concave sealing surface when rotated to a closed position.

In one or more of the above examples, the disc includes a seal guide operable to receive a seal ring, wherein the seal ring contacts the concave sealing surface of the seat ring when the disc engages the concave sealing surface of the seat ring.

In one or more of the above examples, the seal ring is held between the seal guide and a seal retainer coupled to the disc.

In one or more of the above examples, the valve further comprises a retainer ring securing the seat ring to the valve body.

In one or more of the above examples, the valve further comprises a sealing component disposed between the seat ring and the retainer ring.

In one or more of the above examples, the valve further comprises a locator interfacing between the seat ring and the valve body.

In another example embodiment, a valve comprises a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber, wherein the first end of the valve body includes a bore, and a removable seat disposed in the bore and defining at least in part the first flow passageway.

In one or more of the above examples, the removable seat includes a seat ring.

In one or more of the above examples, a portion of the bore includes a profile corresponding to and operable to receive the seat ring.

In one or more of the above examples, the valve further comprises a retainer ring securing the seat ring to the valve body.

In one or more of the above examples, the retainer ring threadedly engages a threaded surface of the bore to secure the seat ring to the valve body.

In one or more of the above examples, the valve further comprises a sealing component disposed between the seat ring and the retainer ring.

In one or more of the above examples, the valve further comprises a locator interfacing between the seat ring and the valve body.

In one or more of the above examples, the locator includes a pin disposed in an opening defined in part by the valve body and in part by an outer surface of the seat ring.

In one or more of the above examples, the valve further comprises a stem rotatably supported by the valve body about a rotation axis and a disc coupled to the stem and rotatable within the interior chamber between a closed position, wherein the disc closes one of the first flow passageway or the second flow passageway, and an open position, wherein at least one of the first flow passageway and the second flow passageway is completely unobstructed between the first end and the second end of the valve body when projected along the longitudinal axis.

In one or more of the above examples, the seat ring includes a concave sealing surface, and wherein the disc engages the concave sealing surface when rotated to the closed position.

In one or more of the above examples, the disc includes a seal ring that contacts the concave sealing surface of the seat ring when the disc engages the concave sealing surface of the seat ring.

In one or more of the above examples, the seal ring of the disc is elliptical.

In one or more of the above examples, the disc defines a central plane offset from the rotation axis.

In one or more of the above examples, a centerline axis of the disc orthogonal to the central plane is offset from the rotation axis.

In one or more of the above examples, a first portion of the seat ring is non-parallel to a second portion of the seat ring.

In one or more of the above examples, the stem includes a first stem portion supported by the valve body and coupled to a top of the disc, and a second stem portion supported by the valve body and coupled to a bottom of the disc, wherein the first and second stem portions are spaced apart on opposite sides of, and do not project into, the at least one of the first flow passageway and the second flow passageway projected along the longitudinal axis.

In one or more of the above examples, the disc includes first and second arms extending from the top and the bottom of the disc respectively, each of the first and second arms including a hub coupled to one of the first and second stem portions.

In one or more of the above examples, both of the first flow passageway and the second flow passageway are completely unobstructed between the first end and the second end of the valve body when each of the first flow passageway and the second flow passageway is projected along the longitudinal axis.

In one or more of the above examples, the first flow passageway and the second flow passageway are coaxial.

In one or more of the above examples, the first flow passageway and the second flow passageway have respective first and second cross-sectional areas defined orthogonal to the longitudinal axis, wherein the first cross-sectional area is the same as the second cross-sectional area.

In another example embodiment, a valve comprises a valve body including a first end and a second end spaced apart along a longitudinal axis and a central portion disposed between the first end and the second end, wherein the first end and the second end define a first flow passageway and a second flow passageway, respectively, and wherein the central portion defines an interior chamber, wherein the first end of the valve body includes a bore, a valve seat disposed in the bore including a concave seating surface, and a disc rotatable within the interior chamber between an open position and a closed position, wherein the disc includes a seal having a shape corresponding to the concave seating surface and wherein the shape of the seal and the concave seating surface define an elliptical offset from a centerline of the valve.

In one or more of the above examples, the concave seating surface includes a first portion and a second portion both at an incline relative to the centerline.

In one or more of the above examples, the seal of the disc includes a first portion and a second portion, wherein the first portion of the seal and the second portion of the seal contact the first portion of the concave seating surface and the second portion of the concave seating surface, respectively, when the disc rotates to the closed position.

In one or more of the above examples, the first portion of the concave seating surface is non-parallel to the second portion of the concave seating surface.

In one or more of the above examples, the first portion of the concave seating surface includes a longer incline than the second portion of the concave seating surface.

In one or more of the above examples, the longer incline of the first portion of the concave seating surface results in a reduced angle between the first portion of the concave seating surface and the centerline than that of an angle between the second portion of the concave seating surface and the centerline.

In one or more of the above examples, the seal in elliptical.

In one or more of the above examples, the seal of the disc includes a first portion and a second portion, wherein the first portion of the seal and the second portion of the seal contact the first portion of the concave seating surface and the second portion of the concave seating surface, respectively, when the disc rotates to the closed position.

In one or more of the above examples, the first portion of the seal is non-parallel to the second portion of the seal.

In one or more of the above examples, the first portion of the seal includes a shorter incline than the second portion of the seal.

In one or more of the above examples, the valve seat is a seat ring operable to be removably installed into the bore.

In one or more of the above examples, the valve further comprises a stem rotatably supported by the valve body about a rotation axis, wherein the disc is coupled to the stem in order to rotate within the interior chamber between the closed position, wherein the disc closes one of the first flow passageway or the second flow passageway, and the open position, wherein at least one of the first flow passageway and the second flow passageway is completely unobstructed between the first end and the second end of the valve body when projected along the longitudinal axis.

In one or more of the above examples, the seal of the disc engages the concave seating surface when the disc is rotated to the closed position.

In one or more of the above examples, the disc defines a central plane offset from the rotation axis.

In one or more of the above examples, a centerline axis of the disc orthogonal to the central plane is offset from the rotation axis.

In one or more of the above examples, the stem includes a first stem portion supported by the valve body and coupled to a top of the disc, and a second stem portion supported by the valve body and coupled to a bottom of the disc, wherein the first and second stem portions are spaced apart on opposite sides of, and do not project into, the at least one of the first flow passageway and the second flow passageway projected along the longitudinal axis.

In one or more of the above examples, the disc includes first and second arms extending from the top and the bottom of the disc respectively, each of the first and second arms including a hub coupled to one of the first and second stem portions.

In one or more of the above examples, the valve seat is a seat ring operable to be removably installed into the bore.

In one or more of the above examples, the valve further comprises a first stem portion supported by the valve body and coupled to a top of the disc, and a second stem portion supported by the valve body and coupled to a bottom of the disc, wherein the first and second stem portions are spaced apart on opposite sides of, and do not project into, the at least one of the first flow passageway and the second flow passageway projected along the longitudinal axis, wherein the first stem portion and the second stem portion are rotatably supported by the valve body about a rotation axis, and wherein the disc closes one of the first flow passageway or the second flow passageway, and the open position.

In one or more of the above examples, the disc defines a central plane offset from the rotation axis and a centerline axis of the disc orthogonal to the central plane is offset from the rotation axis.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While the invention has been described with reference to a preferred embodiment, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A valve comprising:
a valve body including:
a first end and a second end spaced apart along a longitudinal axis;
a central portion defining an interior chamber that is disposed between the first end and the second end, wherein a first flow passageway of a fixed inner bore diameter is formed between the first end and the central portion and a second flow passageway is formed between the second end and the central portion, wherein the second end of the valve body includes a bore;
a removable seat ring defining a removable seat disposed in the bore and defining at least in part the second flow passageway, wherein a diameter of the removable seat matches the fixed inner bore diameter of the first flow passageway;
a retainer ring that removably secures the removable seat ring within the bore by threadedly engaging a threaded annulus of the bore to create a seal between the retainer ring and the removable seat ring;
a disc disposed within the interior chamber;
wherein the interior chamber includes:
an enlarged side portion positioned outside of the at least one of the first flow passageway and the second flow passageway projected along the longitudinal axis, wherein the disc is disposed in the enlarged side portion when in an open position; and
an anti-rotation edge disposed on at least one side of the enlarged side portion, wherein the anti-rotation edge prevents the disc from rotating beyond the anti-rotation edge, wherein the valve body further includes a locator configured to interface between the removable seat ring and the valve body, and wherein the locator includes a notch an indentation on an outermost periphery of the removable seat ring.

2. The valve of claim 1, wherein a portion of the bore includes a profile corresponding to and operable to receive the removable seat ring.

3. The valve of claim 1, wherein the retainer ring secures the removable seat ring to the valve body.

4. The valve of claim 3, further comprising a sealing component disposed between the removable seat ring and the retainer ring.

5. The valve of claim 1, wherein the valve body further includes a stem rotatably supported by the valve body about a rotation axis.

6. The valve of claim 5, wherein the disc is coupled to the stem and rotatable within the interior chamber between a closed position, wherein the disc closes one of the first flow passageway or the second flow passageway via engagement with the removable seat ring, and the open position.

7. The valve of claim 6, wherein the removable seat ring includes a concave sealing surface, and wherein the disc engages the concave sealing surface when rotated to the closed position.

8. The valve of claim 7, wherein the disc includes a seal ring that contacts the concave sealing surface of the removable seat ring when the disc engages the concave sealing surface of the removable seat ring.

9. The valve of claim 8, wherein the seal ring of the disc is elliptical.

10. The valve of claim 6, wherein the disc defines a central plane offset from the rotation axis.

11. The valve of claim 10, wherein a centerline axis of the disc orthogonal to the central plane is offset from the rotation axis.

12. The valve of claim 11, wherein a first portion of the removable seat ring is non-parallel to a second portion of the removable seat ring.

13. The valve of claim 6, wherein the stem includes a first stem portion supported by the valve body and coupled to a top of the disc, and a second stem portion supported by the valve body and coupled to a bottom of the disc, wherein the first and second stem portions are spaced apart on opposite sides of, and do not project into, the at least one of the first flow passageway and the second flow passageway projected along the longitudinal axis.

14. The valve of claim 13, wherein the disc includes first and second arms extending from the top and the bottom of the disc respectively, each of the first and second arms including a hub coupled to one of the first and second stem portions.

15. The valve of claim 1, wherein at least one of the first flow passageway and the second flow passageway is completely unobstructed between the first end and the second end of the valve body when projected along the longitudinal axis.

16. The valve of claim 1, wherein both of the first flow passageway and the second flow passageway are completely unobstructed between the first end and the second end of the valve body when each of the first flow passageway and the second flow passageway is projected along the longitudinal axis.

17. The valve of claim 16, wherein the first flow passageway and the second flow passageway are coaxial.

18. The valve of claim 17, wherein the first flow passageway and the second flow passageway have respective first and second cross-sectional areas defined orthogonal to the longitudinal axis, wherein the first cross-sectional area is the same as the second cross-sectional area.

19. The valve of claim 1, wherein a side of a pin disposed in the valve body fits partially within the notch of the outermost periphery of the removable seat ring when the removable seat ring is installed within the bore at a corresponding rotational orientation.

* * * * *